(12) United States Patent
Landman et al.

(10) Patent No.: US 12,536,008 B2
(45) Date of Patent: Jan. 27, 2026

(54) MANAGING A FEDERATED SOFTWARE REPOSITORY ACROSS MULTIPLE DEVICES

(71) Applicant: JFrog Ltd., Netanya (IL)

(72) Inventors: Yoav Landman, Netanya (IL); Gidi Shabat, Netanya (IL)

(73) Assignee: JFrog Ltd., Netanya (IL)

( * ) Notice: Subject to any disclaimer, the term of this patent is extended or adjusted under 35 U.S.C. 154(b) by 287 days.

(21) Appl. No.: 17/749,524

(22) Filed: May 20, 2022

(65) Prior Publication Data

US 2023/0185559 A1    Jun. 15, 2023

Related U.S. Application Data

(60) Provisional application No. 63/273,664, filed on Oct. 29, 2021.

(51) Int. Cl.
*G06F 16/25* (2019.01)
*G06F 8/65* (2018.01)
*G06F 8/71* (2018.01)
*G06F 9/46* (2006.01)
*G06F 16/178* (2019.01)

(52) U.S. Cl.
CPC ................. *G06F 8/65* (2013.01); *G06F 8/71* (2013.01); *G06F 9/46* (2013.01); *G06F 16/178* (2019.01); *G06F 16/256* (2019.01)

(58) Field of Classification Search
None
See application file for complete search history.

(56) References Cited

U.S. PATENT DOCUMENTS

| | | |
|---|---|---|
| 5,671,282 A | 9/1997 | Wolff et al. |
| 5,915,238 A | 6/1999 | Tjaden |
| 5,931,946 A | 8/1999 | Terada et al. |

(Continued)

FOREIGN PATENT DOCUMENTS

WO    WO-2012153173 A2    11/2012

OTHER PUBLICATIONS

Wikipedia, "Background process" as archived Jun. 19, 2021 and retrieved from <https://en.wikipedia.org/w/index.php?title=Background_process&oldid=1029356788> on Apr. 28, 2025 (Year: 2021).*

(Continued)

*Primary Examiner* — Jason D Mitchell
(74) *Attorney, Agent, or Firm* — Norton Rose Fulbright US LLP

(57) ABSTRACT

The present disclosure provides systems, methods, and computer readable storage devices for managing a federated software repository. A method includes storing, at a first member of a multi-device software repository, at least one file and metadata corresponding to the at least one file. The method includes adding an entry to an event log queue. The entry indicates addition of the at least one file. The method includes sending the metadata corresponding to the at least one file to other members of the multi-device software repository for storage at the other devices. The method includes performing, at a later time from sending the metadata, one or more repository update operations that include sending the at least one file to at least a second member of the multi-device software repository.

21 Claims, 17 Drawing Sheets

(56) References Cited

U.S. PATENT DOCUMENTS

| | | |
|---|---|---|
| 6,604,236 B1 | 8/2003 | Draper et al. |
| 6,802,061 B1 | 10/2004 | Parthasarathy et al. |
| 7,007,042 B2 | 2/2006 | Lubbers et al. |
| 7,403,901 B1 | 7/2008 | Carley et al. |
| 7,464,158 B2 | 12/2008 | Albornoz |
| 7,685,148 B2 | 3/2010 | Engquist et al. |
| 7,814,146 B2 | 10/2010 | Chavez et al. |
| 7,987,368 B2 | 7/2011 | Zhu et al. |
| 8,036,140 B2 | 10/2011 | Rao et al. |
| 8,131,838 B2 | 3/2012 | Bornhoevd et al. |
| 8,196,186 B2 | 6/2012 | Mityagin et al. |
| 8,239,446 B2 | 8/2012 | Navar et al. |
| 8,364,758 B2 | 1/2013 | Hydrie et al. |
| 8,413,198 B2 | 4/2013 | Connor et al. |
| 8,510,571 B1 | 8/2013 | Chang et al. |
| 8,688,803 B2 | 4/2014 | Manion et al. |
| 8,788,830 B2 | 7/2014 | Piersol |
| 9,009,820 B1 | 4/2015 | McDougal et al. |
| 9,053,124 B1 | 6/2015 | Dornquast et al. |
| 9,280,339 B1 | 3/2016 | Prunicki et al. |
| 9,607,043 B2* | 3/2017 | Nguyen ............... G06F 16/256 |
| 9,635,107 B2 | 4/2017 | Souza et al. |
| 9,659,155 B2 | 5/2017 | Kosovan |
| 9,805,056 B2* | 10/2017 | Parkison ............ G06F 11/2089 |
| 9,819,665 B1 | 11/2017 | Machani |
| 9,842,062 B2 | 12/2017 | Ford et al. |
| 9,946,531 B1 | 4/2018 | Fields et al. |
| 9,959,394 B2 | 5/2018 | Vlot et al. |
| 9,971,594 B2 | 5/2018 | Fox et al. |
| 10,037,204 B2* | 7/2018 | Patton .................... G06F 16/00 |
| 10,043,026 B1 | 8/2018 | Salour et al. |
| 10,091,215 B1 | 10/2018 | Word |
| 10,146,788 B1* | 12/2018 | Weatherall ............. G06F 3/067 |
| 10,216,757 B1* | 2/2019 | Armangau ........... G06F 16/178 |
| 10,339,299 B1 | 7/2019 | Magnuson et al. |
| 10,387,369 B1* | 8/2019 | Davenport ............ G06F 3/0689 |
| 10,387,570 B2 | 8/2019 | VanBlon et al. |
| 10,409,838 B1 | 9/2019 | George et al. |
| 10,440,106 B2 | 10/2019 | Murstein et al. |
| 10,528,262 B1* | 1/2020 | Shmuylovich ......... G06F 3/067 |
| 10,540,173 B2* | 1/2020 | Patton .................... G06F 16/256 |
| 10,552,138 B2 | 2/2020 | Smith et al. |
| 10,701,143 B1* | 6/2020 | Jha ......................... H04L 67/01 |
| 10,719,369 B1 | 7/2020 | Aithal et al. |
| 10,754,952 B1 | 8/2020 | Muller et al. |
| 10,785,334 B2 | 9/2020 | Kristiansson et al. |
| 10,809,932 B1* | 10/2020 | Armangau ............. G06F 16/13 |
| 10,812,975 B1 | 10/2020 | Easwar Prasad et al. |
| 10,880,150 B1* | 12/2020 | Farber .................... H04L 43/106 |
| 10,880,407 B2 | 12/2020 | Reynolds et al. |
| 10,911,337 B1 | 2/2021 | De Kosnik et al. |
| 10,986,387 B1 | 4/2021 | Parulkar et al. |
| 11,048,590 B1 | 6/2021 | Sapuntzakis et al. |
| 11,064,323 B2 | 7/2021 | Esselink et al. |
| 11,106,554 B2 | 8/2021 | Landman |
| 11,176,154 B1* | 11/2021 | Dasgupta ................ G06F 9/451 |
| 11,249,739 B2 | 2/2022 | Atkinson et al. |
| 11,284,258 B1 | 3/2022 | Wei et al. |
| 11,503,076 B2 | 11/2022 | White et al. |
| 11,921,595 B2* | 3/2024 | Sekar ................. H04L 67/1097 |
| 2002/0062439 A1 | 5/2002 | Cotugno et al. |
| 2002/0156893 A1 | 10/2002 | Pouyoul et al. |
| 2002/0198920 A1 | 12/2002 | Resnick et al. |
| 2003/0191955 A1 | 10/2003 | Wagner et al. |
| 2003/0220880 A1 | 11/2003 | Lao et al. |
| 2004/0030731 A1* | 2/2004 | Iftode .................... G06F 16/10 |
| 2004/0054764 A1 | 3/2004 | Aderton et al. |
| 2004/0064722 A1 | 4/2004 | Neelay et al. |
| 2004/0181561 A1 | 9/2004 | Knox et al. |
| 2004/0250115 A1 | 12/2004 | Gemmel et al. |
| 2004/0267807 A1* | 12/2004 | Barabas ................... G06F 9/46 |
| 2005/0055386 A1* | 3/2005 | Tosey ................... G06Q 10/107 |
| 2005/0071385 A1 | 3/2005 | Rao |
| 2005/0132348 A1 | 6/2005 | Meulemans et al. |
| 2006/0107286 A1 | 5/2006 | Connor et al. |
| 2006/0136547 A1 | 6/2006 | Neuhaus et al. |
| 2006/0195816 A1 | 8/2006 | Grandcolas et al. |
| 2006/0236392 A1 | 10/2006 | Thomas et al. |
| 2006/0259967 A1 | 11/2006 | Thomas et al. |
| 2007/0169199 A1 | 7/2007 | Quinnell et al. |
| 2007/0220575 A1 | 9/2007 | Cooper et al. |
| 2007/0294686 A1 | 12/2007 | Oh |
| 2008/0005113 A1 | 1/2008 | Li |
| 2008/0005120 A1 | 1/2008 | Li |
| 2008/0082648 A1 | 4/2008 | Ahmed et al. |
| 2008/0163374 A1 | 7/2008 | Rogers et al. |
| 2008/0178287 A1 | 7/2008 | Akulavenkatavara et al. |
| 2008/0294860 A1 | 11/2008 | Stakutis et al. |
| 2009/0013317 A1 | 1/2009 | Abfalter et al. |
| 2009/0083812 A1 | 3/2009 | Tang |
| 2009/0119655 A1 | 5/2009 | Quilty |
| 2009/0144340 A1 | 6/2009 | Ferguson et al. |
| 2009/0210697 A1 | 8/2009 | Chen et al. |
| 2009/0271412 A1* | 10/2009 | Lacapra ................ G06F 16/178 |
| 2009/0290715 A1 | 11/2009 | Mityagin et al. |
| 2009/0313353 A1 | 12/2009 | Lou |
| 2010/0185614 A1* | 7/2010 | O'Brien ................ G06F 16/134 |
| | | 707/769 |
| 2010/0217694 A1 | 8/2010 | Knighton |
| 2010/0223472 A1 | 9/2010 | Alvarsson |
| 2010/0287363 A1 | 11/2010 | Thorsen |
| 2011/0010258 A1 | 1/2011 | Chavez et al. |
| 2011/0010421 A1 | 1/2011 | Chavez et al. |
| 2011/0071841 A1 | 3/2011 | Fomenko et al. |
| 2011/0072075 A1 | 3/2011 | Gautier |
| 2011/0093701 A1 | 4/2011 | Etchegoyen |
| 2011/0107419 A1 | 5/2011 | Vidal et al. |
| 2011/0113012 A1 | 5/2011 | Gruhl et al. |
| 2011/0225311 A1 | 9/2011 | Liu et al. |
| 2011/0307564 A1 | 12/2011 | Luo et al. |
| 2012/0072763 A1* | 3/2012 | Lu ........................ G06F 16/183 |
| | | 707/704 |
| 2012/0090025 A1 | 4/2012 | Milner et al. |
| 2012/0131566 A1 | 5/2012 | Morgan et al. |
| 2012/0151051 A1 | 6/2012 | Zhang et al. |
| 2012/0151245 A1 | 6/2012 | Chang et al. |
| 2012/0159469 A1 | 6/2012 | Laor |
| 2012/0210312 A1 | 8/2012 | Ma et al. |
| 2012/0222112 A1 | 8/2012 | DiFalco et al. |
| 2012/0233134 A1 | 9/2012 | Barton et al. |
| 2012/0240096 A1 | 9/2012 | Sass |
| 2012/0240236 A1 | 9/2012 | Wyatt et al. |
| 2012/0259920 A1 | 10/2012 | Mathieu et al. |
| 2012/0297405 A1 | 11/2012 | Zhang et al. |
| 2013/0073727 A1 | 3/2013 | Souza et al. |
| 2013/0081100 A1 | 3/2013 | Sreehari et al. |
| 2013/0124807 A1 | 5/2013 | Nielsen et al. |
| 2013/0132946 A1 | 5/2013 | Ma |
| 2013/0268927 A1 | 10/2013 | Cochran |
| 2013/0326481 A1 | 12/2013 | Kannan |
| 2013/0326494 A1 | 12/2013 | Nunez |
| 2014/0074882 A1* | 3/2014 | Vyvyan ................... G06F 16/22 |
| | | 707/770 |
| 2014/0172972 A1 | 6/2014 | Burba et al. |
| 2014/0173024 A1 | 6/2014 | Burba et al. |
| 2014/0245376 A1 | 8/2014 | Hibbert et al. |
| 2014/0280457 A1* | 9/2014 | Anton ..................... H04L 67/51 |
| | | 709/202 |
| 2014/0373160 A1 | 12/2014 | Shigemoto et al. |
| 2015/0003296 A1 | 1/2015 | Fan et al. |
| 2015/0088992 A1 | 3/2015 | Ioannidis et al. |
| 2015/0099510 A1 | 4/2015 | Shah et al. |
| 2015/0172352 A1 | 6/2015 | Gopalakrishnan et al. |
| 2015/0180893 A1 | 6/2015 | Im et al. |
| 2015/0268881 A1 | 9/2015 | Nielsen et al. |
| 2015/0301823 A1 | 10/2015 | Hatakeyama |
| 2015/0301824 A1* | 10/2015 | Patton .................... G06F 16/00 |
| | | 717/122 |
| 2015/0302037 A1 | 10/2015 | Jackson et al. |
| 2015/0312243 A1 | 10/2015 | Ponsford et al. |
| 2015/0317145 A1 | 11/2015 | Katariya et al. |
| 2015/0341178 A1 | 11/2015 | Tanaka et al. |
| 2015/0341325 A1 | 11/2015 | Al Jabri |

(56) References Cited

U.S. PATENT DOCUMENTS

| | | | |
|---|---|---|---|
| 2015/0350004 A1* | 12/2015 | Sekar | G06F 3/06 709/248 |
| 2015/0350186 A1 | 12/2015 | Chan et al. | |
| 2015/0370827 A1* | 12/2015 | Parkison | G06F 16/178 707/610 |
| 2016/0006837 A1 | 1/2016 | Reynolds et al. | |
| 2016/0117235 A1 | 4/2016 | Mishra et al. | |
| 2016/0124665 A1 | 5/2016 | Jain et al. | |
| 2016/0164900 A1 | 6/2016 | Pericin | |
| 2016/0179867 A1 | 6/2016 | Li et al. | |
| 2016/0182494 A1 | 6/2016 | Lissounov et al. | |
| 2016/0182556 A1 | 6/2016 | Tatourian et al. | |
| 2016/0234237 A1 | 8/2016 | Thakar et al. | |
| 2016/0266890 A1 | 9/2016 | Aleksandrov et al. | |
| 2016/0267101 A1 | 9/2016 | Clissold et al. | |
| 2016/0299835 A1 | 10/2016 | Jain et al. | |
| 2016/0344834 A1 | 11/2016 | Das | |
| 2016/0373440 A1 | 12/2016 | Mather et al. | |
| 2017/0003951 A1 | 1/2017 | Newell et al. | |
| 2017/0034023 A1 | 2/2017 | Nickolov et al. | |
| 2017/0060546 A1 | 3/2017 | Prasad et al. | |
| 2017/0147338 A1 | 5/2017 | Jackson et al. | |
| 2017/0177445 A1* | 6/2017 | Lai | G06F 16/178 |
| 2017/0262657 A1 | 9/2017 | Salmon-Legagneur et al. | |
| 2017/0264588 A1 | 9/2017 | Hunt et al. | |
| 2017/0300309 A1 | 10/2017 | Berger et al. | |
| 2017/0353933 A1* | 12/2017 | Xhafa | H04W 56/001 |
| 2017/0357496 A1 | 12/2017 | Smith et al. | |
| 2017/0357807 A1 | 12/2017 | Harms et al. | |
| 2017/0371499 A1 | 12/2017 | Checkley et al. | |
| 2018/0095993 A1 | 4/2018 | Clark | |
| 2018/0136923 A1 | 5/2018 | Xiao | |
| 2018/0189043 A1 | 7/2018 | Habayeb | |
| 2018/0240546 A1 | 8/2018 | Pfeiffer | |
| 2018/0260212 A1* | 9/2018 | Wisnovsky | G06F 16/134 |
| 2018/0373517 A1 | 12/2018 | Hu | |
| 2019/0014161 A1 | 1/2019 | Doar et al. | |
| 2019/0050255 A1* | 2/2019 | Chagam Reddy | G06F 9/4881 |
| 2019/0050576 A1 | 2/2019 | Boulton | |
| 2019/0080080 A1 | 3/2019 | Ogura et al. | |
| 2019/0130114 A1 | 5/2019 | Smith et al. | |
| 2019/0138287 A1 | 5/2019 | De Capoa et al. | |
| 2019/0141163 A1 | 5/2019 | Markham et al. | |
| 2019/0155598 A1 | 5/2019 | Bainville et al. | |
| 2019/0187980 A1* | 6/2019 | Patton | G06F 16/256 |
| 2019/0205121 A1 | 7/2019 | Ericson | |
| 2019/0303623 A1 | 10/2019 | Reddy et al. | |
| 2019/0305957 A1 | 10/2019 | Reddy et al. | |
| 2019/0306173 A1 | 10/2019 | Reddy et al. | |
| 2019/0332367 A1 | 10/2019 | Navarrete Michelini et al. | |
| 2019/0379723 A1 | 12/2019 | Demasi et al. | |
| 2020/0012441 A1 | 1/2020 | Chheda et al. | |
| 2020/0026857 A1 | 1/2020 | Muller et al. | |
| 2020/0034132 A1 | 1/2020 | U et al. | |
| 2020/0076618 A1 | 3/2020 | Driever et al. | |
| 2020/0076807 A1 | 3/2020 | Driever et al. | |
| 2020/0084202 A1 | 3/2020 | Smith et al. | |
| 2020/0162543 A1 | 5/2020 | Mosko et al. | |
| 2020/0177397 A1 | 6/2020 | Harrington | |
| 2020/0186505 A1 | 6/2020 | Amar et al. | |
| 2020/0213144 A1 | 7/2020 | Maloy | |
| 2020/0244297 A1* | 7/2020 | Zalewski | H04W 76/10 |
| 2020/0252207 A1 | 8/2020 | Hanel et al. | |
| 2020/0293382 A1* | 9/2020 | Ivancich | G06F 9/526 |
| 2020/0351089 A1 | 11/2020 | Wentz | |
| 2020/0372183 A1 | 11/2020 | Rangaiah et al. | |
| 2020/0409986 A1 | 12/2020 | Soroushian et al. | |
| 2020/0412691 A1 | 12/2020 | Shribman et al. | |
| 2021/0021428 A1 | 1/2021 | Landman | |
| 2021/0026611 A1* | 1/2021 | Bequet | G06F 16/90344 |
| 2021/0081367 A1* | 3/2021 | Madisetti | G06Q 10/103 |
| 2021/0111875 A1 | 4/2021 | Le Saint | |
| 2021/0200834 A1* | 7/2021 | Adams | G06F 16/972 |
| 2021/0218800 A1 | 7/2021 | Landman | |
| 2021/0234749 A1* | 7/2021 | Vazirani | H04L 67/34 |
| 2021/0263911 A1* | 8/2021 | Gamiz | H04L 67/1097 |
| 2021/0304142 A1* | 9/2021 | Bar-on | G06F 8/73 |
| 2022/0150073 A1 | 5/2022 | Androulaki et al. | |
| 2022/0300531 A1* | 9/2022 | Boshev | G06F 11/203 |
| 2022/0326944 A1 | 10/2022 | Khan et al. | |
| 2023/0145461 A1* | 5/2023 | Templeton | G06F 11/3664 705/7.15 |
| 2023/0289368 A1* | 9/2023 | Boshev | G06F 11/2097 |

OTHER PUBLICATIONS

Patent Cooperation Treaty, International Search Report and Written Opinion issued for PCT Application No. PCT/IB2020/056777, dated Oct. 19, 2020, 15 pages.

Li et al. "A Quantitative and Comparative Study of Network-Level Efficiency for Cloud Storage Services," ACM Trans. Model. Perform. Eval. Comput. Syst., vol. 4, No. 1, Article 3, 2019, 32 pages.

Jana et al. "Management of Security and Privacy Issues of Application Development in Mobile Cloud Environment: A Survey," IEEE International Conference on Recent Advances and Innovations in Engineering, May 2014, 6 pages.

Patent Cooperation Treaty, International Search Report and Written Opinion issued for PCT Application No. PCT/IB2020/056776, dated Feb. 22, 2021, 10 pages.

Post, H. et al., "Linking Functional Requirements and Software Verification," 2009 17th IEEE International Requirements Engineering Conference, 2009, 8 pages.

Patent Cooperation Treaty, International Search Report and Written Opinion issued for PCT Application No. PCT/IB2021/050134, dated Mar. 4, 2021, 14 pages.

JFrog; "Access Tokens," https://www.jfrog.com/confluence/display/JCR6X/Access+Tokens, Jan. 29, 2020 (Year: 2020), 1 page.

Alibaba Cloud; "Alibaba Dragonfly DCOS Case Study: China Mobile (Zhejiang Branch)," https://alibaba-cloud.medium.com/alibaba-dragonfly-dcos-case-study-china-mobile-zhejiang-branch-a13dc751a2c, Jan. 14, 2019 (Year: 2019), 14 pages.

eduonix.com; "Alibaba's DragonFly—A New P2P File Distribution Framework," https://blog.eduonix.com/software-development/alibabas-dragonfly-p2p-distribution/, Jul. 4, 2018 (Year: 2018), 3 pages.

Alibaba Cloud; "Behind Alibaba's Double 11 Mysterious "Dragonfly" Technology® C PB-Grade Large-File Distribution System," https://www.alibabacloud.com/blog/behind-alibabas-double-11-mysterious-dragonfly-technology-®c-pb-grade-large-file-distribution-system_594074, Oct. 15, 2018 (Year: 2018), 14 pages.

Seneviratne, AIDK; "Enabling an Authentication Mechanism for Docker Remote API," Mar. 2017 (Year: 2017), 70 pages.

IEEE; "FID: A Faster Image Distribution System for Docker Platform," 2017 (Year: 2017), 8 pages.

DragonFly; "What Is DragonFly?" https://web.archive.org/web/20190501065255/https://d7y.io/enus/docs/overview/what_is_dragonfly.html, May 1, 2019 (Year: 2019), 3 pages.

Uber Engineering Blog; "Introducing Kraken, an Open Source Peer-to-Peer Docker Registry," https://eng.uber.com/introducing-kraken/, May 5, 2019 (Year: 2019), 3 pages.

JFrog; "Searching for Artifacts," https://www.jfrog.com/confluence/display/JCR6X/Searching+for+Artifacts, Jan. 29, 2020 (Year: 2020), 3 pages.

Yoshida et al. "Understanding the Origins of Weak Cryptographic Algorithms Used for Signing Android Apps," 2018 42$^{nd}$ IEEE International Conference on Computer Software and Applications; 6 pages.

H. B. Hadj Abdallah and W. Louati, "Ftree-CDN: Hybrid CDN and P2P Architecture for Efficient Content Distribution," 2019 27th Euromicro International Conference on Parallel, Distributed and Network-Based Processing (PDP), Pavia, Italy, 2019, pp. 438-445, doi: 10.1109/EMPDP.2019.8671549. (Year: 2019), 8 pages.

M. Srivatsa, B. Gedik and Ling Liu, "Scaling Unstructured Peer-to-Peer Networks with Multi-Tier Capacity-Aware Overlay Topologies," Proceedings. Tenth International Conference on Parallel and Distributed Systems, 2004. ICPADS 2004., Newport Beach, CA, USA, 2004, pp. 17-24. (Year: 2004), 8 pages.

F. Turkmen, P. Mazzoleni, B. Crispo and E. Bertino, "P-CDN: Extending Access Control Capabilities of P2P Systems to Provide

(56) References Cited

OTHER PUBLICATIONS

CDN Services," 2008 IEEE Symposium on Computers and Communications, Marrakech, Morocco, 2008, pp. 480-486, doi: 10.1109/ISCC.2008.4625671. (Year: 2008), 7 pages.

* cited by examiner

MANAGING A FEDERATED SOFTWARE REPOSITORY ACROSS MULTIPLE DEVICES

CROSS-REFERENCE TO RELATED APPLICATIONS

The present application claims the benefit of U.S. Provisional Patent Application No. 63/273,664, filed Oct. 29, 2021 entitled "MANAGING LINKED SOFTWARE REPOSITORIES", and is related to co-pending U.S. patent application Ser. No. 16/399,905 entitled "DATA BUNDLE GENERATION AND DEPLOYMENT," filed Apr. 30, 2019; to U.S. patent application Ser. No. 16/399,915 entitled "ACTIVE-ACTIVE ENVIRONMENT CONTROL," filed Apr. 30, 2019, issued as U.S. Pat. No. 11,106,554 on Aug. 31, 2021; to co-pending U.S. patent application Ser. No. 16/399,938 entitled "DATA FILE PARTITION AND REPLICATION," filed Apr. 30, 2019; and to co-pending U.S. patent application Ser. No. 16/399,953 entitled "DATA FILE PARTITION AND REPLICATION" filed Apr. 30, 2019, the disclosures of which are incorporated by reference herein in their entirety.

TECHNICAL FIELD

The present application is generally related to the technical field of software repositories, and more particularly, but not by way of limitation, to managing a federated software repository across multiple devices connected via one or more networks.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Software can be updated to add or remove functionality, to correct bugs (e.g., critical/functional issues), and/or to address security issues. Developing and updating software can occur at multiple locations (e.g., different local development environments) around the globe, with each location needing access to the same files/software. One way to support the development of software at multiple locations is to store software in a repository. A repository is a central storage location for software packages (e.g., one or more files of a software release) in addition to metadata and other information related to the software packages. When software is to be added, modified, or deleted, a connected device may provide the new or modified software, or instruction to delete software, to the repository for updating the software stored at the repository. Client devices may retrieve (e.g., pull) software packages from the repository for installation and execution at the client devices.

Maintaining a single software repository for an enterprise with development teams across the globe poses multiple challenges. To illustrate, synchronizing or updating software at the repository may be relatively quick for devices in the same geographic location as the repository, but may be time consuming for devices in other geographic regions depending on file sizes, network topology, network latency, and bandwidth limitations. Deploying multiple software repositories at different geographic locations may improve response times for client devices interacting with the repositories in the other geographic locations. However, supporting multiple software repositories presents its own challenges. For example, modifications to software at one repository should be propagated to other software repositories quickly and efficiently, such that the same stored software releases are effectively "seen" by all devices regardless of geographic location. Such propagation may be difficult due to insufficient bandwidth or may significantly increase latency in the network. If the repositories are not updated quickly enough, conflicts may occur between software releases stored at the different repositories, which may result in improper builds, different client devices executing different versions of software, or other such issues. Synchronizing related metadata and supporting software developed using containers (e.g., executable file packages) pose additional challenges to merely synchronizing individual files at the multiple repositories. Additionally, in order to manage multiple repositories, additional servers or other overhead may be added to the network, thereby increasing cost and complexity for the enterprise.

BRIEF SUMMARY

Aspects of the present disclosure provide systems, methods, and computer-readable storage media that support management of federated software repositories across multiple devices, such as a federated software repository that includes multiple members at different geographic locations that are communicatively coupled together via a network. Such an arrangement of multiple members that each store the same set of software (e.g., software packages and/or software releases) may be referred to as a federated repository. Configuration of a federated repository may enable devices at multiple different geographic locations to share stored software packages (e.g., software releases) without experiencing some of the above-described challenges associated with a single software repository at a single location or multiple non-synchronized software repositories. To illustrate, a first member of a federated software repository (e.g., a multi-device repository) at a first location and a second member of the federated software repository at a second location may be communicatively coupled via one or more networks. The members correspond to different devices (e.g., different servers or other computing devices) that may implement a single, global (or otherwise networked) software repository that is mirrored at the individual repositories of the members. Thus, the two members are configured to store copies of the same software packages. When a change is made at one of the members, such as addition of one or more new files or modification of one or more existing files, that member may generate or update metadata based on the change and send the metadata to the other member. Because the metadata is lightweight and has a small network signature, metadata may be exchanged between members of the federated software repository nearly instantaneously to support sequential metadata updates at the members without waiting for the larger files to be transferred. Sending the metadata enables the other member to adapt based on the change, including in some implementations creating a placeholder (e.g., "hollow") file based on the metadata, without needing to wait for transmission of the new or modified files. Instead, entries may be added to event log queues at the members to indicate operations that have occurred to one or more files. Additionally, each member may maintain and update a respective file queue with entries of operations, such as transferring files, to be performed as repository update operations at a later time, such as during a period of reduced processing resource use or network congestion. In some implementations, the repository update operations may be performed as background operations, after performance of conflict handling and deduplication operations on the file queues, to reduce or eliminate redundant file transfers. In this manner, users in New Jersey and London may access and modify files from respective geographically-nearby servers (e.g., different members) that are synchronized to support a shared, federated software repository between the two locations.

As an illustrative example of operations, a first member of a federated software repository may be communicatively coupled to a second member of the federated software repository via a network. The two members (e.g., computing devices) may be linked as/form a mesh, such that there is no server or other overhead device to manage operations of the members. A user of the first member may create a new artifact to be added to a software package stored at the federated software repository. The first member may add an entry to a respective event log queue indicating addition of the new artifact, and the artifact, including a file and metadata corresponding to the file, may be stored at the first member. Additionally, the first member may send the metadata corresponding to the file to the second member. The second member may add an entry to a respective event log queue indicating addition of the file, and the second member may store the received metadata with a placeholder (e.g., temporary) file as a new artifact, also referred to as a "hollow" blob or artifact, at the second member. The second member may also add an entry to a respective file queue, the entry indicating to import the file from the first member. Additional operations performed at the second member may be performed with an awareness of the artifact due to the presence of the metadata and the placeholder file, such as changing permissions, modifying settings, adding or removing links or dependencies, reading searchable properties that are part of the state of the artifact synced to the second member, or the like, even though the file has not been received at this time. At a later time, either during asynchronous/event-based synching or a designated sync time period, such as a time period of less congestion at the network, a time period of less processing by the members, a background operation time period, or the like, entries in the file queues may be used to initiate performance of actions to complete any changes to the files stored at the members of the federated software repository. For example, the second member may import the file from the first member, and the second member may overwrite the placeholder file with the second file. Storing entries in file queues for later performance may enable conflict resolution and deduplication procedures, as further described herein, to reduce or eliminate redundant or unnecessary use of network resources. Additionally or alternatively, the members may be configured to support a sync command, such as from a user or based on a trigger condition or automatic identification of a sync error by a member, to synchronize the repositories upon receipt of the sync command or automatic syncing instead of waiting until performance of the repository update operations. For example, a user of the second member may provide a sync command (e.g., based on a binary download request for a file) prior to the designated sync time period or the asynchronous synching to cause the second member to retrieve the file from the first member on-demand. Additionally or alternatively, a full sync command may be issued by the second member when the second member joins or when resynchronization due to a network issue is requested. These sync commands may be useful to synchronize a new member of the federated software repository that links to the first or second members, to update files if the one of the queues falls behind a threshold, or if the files are urgently needed by a user.

According to one aspect, a method for managing a federated software repository across multiple devices includes storing, by one or more processors of a first member of a multi-device software repository, at least one file and metadata corresponding to the at least one file at the first member. The method also includes adding, by the one or more processors, an entry to an event log queue of the first member. The entry indicates addition of the at least one file. The method includes sending, by the one or more processors and based on the entry in the event log queue, the metadata corresponding to the at least one file to other members of the multi-device software repository for storage at the other members. The method further includes performing, by the one or more processors at a later time from sending the metadata, one or more repository update operations that include sending the at least one file to at least a second member of the multi-device software repository.

According to another aspect, a system for managing a federated software repository across multiple devices includes at least one memory storing instructions and one or more processors coupled to the at least one memory. The one or more processors are configured to execute the instructions to cause the one or more processors to store at least one file and metadata corresponding to the at least one file. The at least one file is associated with a multi-device software repository. The one or more processors are also configured to execute the instructions to add an entry to an event log queue. The entry indicates addition of the at least one file. The one or more processors are configured to execute the instructions to send, based on the entry in the event log queue, the metadata corresponding to the at least one file to other members of the multi-device software repository for storage at the other members. The one or more processors are further configured to execute the instructions to perform, at a later time from sending the metadata, one or more repository update operations that include sending the at least one file to a second member of the multi-device software repository.

According to another aspect, a non-transitory computer-readable storage medium stores instructions that, when executed by one or more processors, cause the one or more processors to perform operations for managing a federated software repository across multiple devices. The operations include executing a first routine to store at least one file and metadata corresponding to the at least one file at a first member of a multi-device software repository. The operations also include executing a second routine to add an entry to an event log queue of the first member. The entry indicates addition of the at least one file. The operations include executing a third routine to send, based on the entry in the event log queue, the metadata corresponding to the at least one file to other members of the multi-device software repository for storage at the other members. The operations further include executing a fourth routine to perform, at a later time from sending the metadata, one or more repository update operations that include sending the at least one file to at least a second member of the multi-device software repository.

Aspects of the present disclosure provide benefits compared to conventional software repositories. For example, the systems and techniques described herein support mirroring of software packages (e.g., software releases) to multiple devices at different geographical locations, resulting in a managed, global (or other size) federated software repository with full location transparency. Management of the federated repository is performed by the members (e.g., devices) themselves instead of a server or other overhead equipment, and the management is site agnostic. Because the members of the federated repository are connected as a mesh, the federated repository provides improved network benefits by locating members at different geographic locations without requiring centralized management or overhead. Additionally, the individual members (e.g., servers or other devices) share "lightweight" metadata in real time or near-real time to propagate file modifications to other repositories instead of waiting for sharing of the modified files, which may not be possible in real time or near-real time. Sharing the metadata synchronously and then replicating the files in parallel enables the federated repository to meet requirements of some systems that artifact replications to be performed in order, with similar performance to full parallelism. Additionally, the members maintain ordered event log queues and file queues to solve conflicts and avoid duplication of transmissions. Repository update operations (e.g., file exchange operations) may be performed as background operations at a later time, to take advantage of times of less network congestion and/or less processing resource use, or may be performed on-demand based on a request from a user or an application for the file.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying figures, in which.

Figure 1:
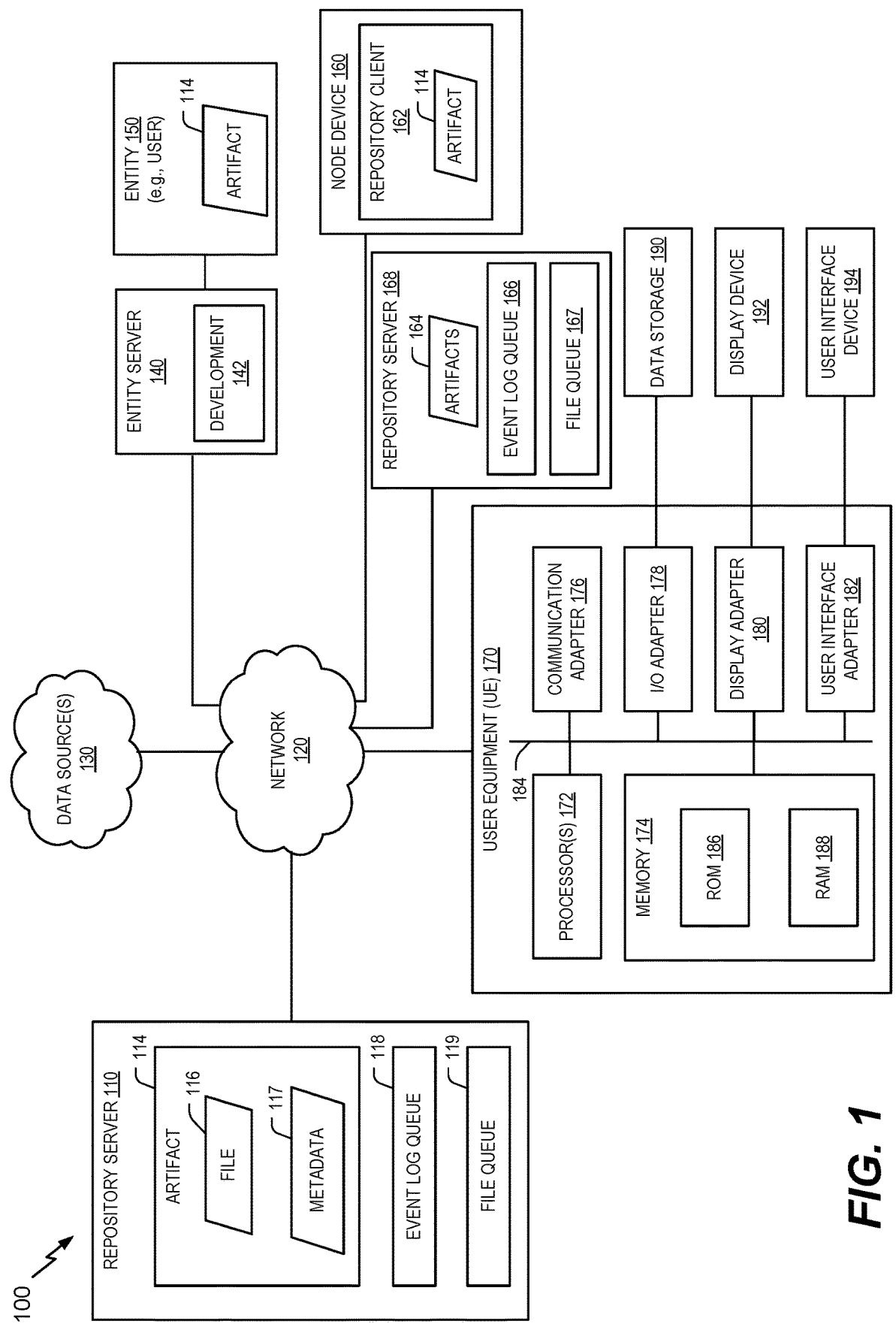
FIG. 1 is a block diagram of an example of a system that includes a server for managing a federated software repository.

Although the present disclosure and its advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

DETAILED DESCRIPTION

Inventive concepts described herein describe systems, methods, and computer-readable storage media that support management of shared software repositories (e.g., a federated repository) across multiple devices, such as at different geographic locations. The federated software repository may enable members (e.g., devices) to mirror stored software packages (e.g., software releases) and/or artifacts such that a modification to software at one member is signaled to other members quickly (e.g., in real time or near real time) via exchange of lightweight metadata instead of exchanging the files themselves, which may be time consuming based on the number and sizes of the files to be shared. To illustrate, a first member at a first location and a second member at a second location may be communicatively coupled via one or more networks. When a change is made at one of the members, such as addition of one or more new files or modification of one or more existing files, that member may generate or update metadata based on the change and send the metadata to the other member. Sending the metadata, which includes searchable properties corresponding to the file, enables the other member to adapt based on the change, including in some implementations creating a placeholder (e.g., "hollow") file based on the metadata, without needing to wait for transmission of the new or modified files themselves. This enables real-time or near-real time serial operations across multiple members of a federated software repository. Additionally, the members may maintain event log queues and file queues to indicate operations that have been performed and operations to be performed, such as importing files, as part of repository update operations. Maintaining the event log queues and the file queues and delaying sharing of files may enable conflict resolution and deduplication procedures to reduce redundant or unnecessary file transmission. Additionally, the repository update operations may be triggered by a member that requests the files, thereby enabling the member to wait until a time when there is less network congestion or when more processing resources are available to import the file (e.g., during background operations). In some implementations, one or more devices may be members of multiple different federated software repositories (e.g., multi-device software repositories), and metadata transfers associated with different repositories may be aggregated together at the members for more efficient metadata sharing. As further described herein, one or more aspects of the federated software repository support other features and improvements, such as automatic error identification and synchronization triggering, multiple techniques to secure communications between members of federated software repositories, automatic configuration change or conflict identification, simple conflict resolution, checksum-based repositories that prevent unnecessary file imports, and support for indexing of cross-site software development.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that aspects of the disclosure may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for managing a federated software repository according to one or more aspects is shown and designated 100. As used herein, a federated software repository refers to a multi-device software repository, or stated another way, a shared software repository across multiple devices.

As further described herein, a device may be a member of more than one federated software repository with the same or different other devices. System 100 includes a server 110 (e.g., a first repository server or member server), a network 120, data sources 130, an entity server 140, an entity 150, a node device 160, a server 168 (e.g., a second repository server or member server), and user equipment 170. Although shown in FIG. 1 as a single system, components of the system 100 may be located at different locations to support a federated software repository for use by a multi-site software development team, as further described herein with reference to FIGS. 2-3.

Server 110 may include one or more servers that, according to some implementations, are configured to perform several of the functions and/or operations described herein. One or more of the servers comprising server 110 may include memory, storage hardware, software residing thereon, and one or more processors configured to perform functions associated with system 100, as described further herein at least with reference to FIGS. 2-9. One of skill in the art will readily recognize that different server and computer architectures can be utilized to implement server 110, and that server 110 is not limited to a particular architecture so long as the hardware implementing server 110 supports the functions of the system disclosed herein. As shown in FIG. 1, user equipment can be used to enable an owner and/or administrator of server 110 to access and modify aspects (e.g., instructions, applications, data) of server 110. For example, components comprising user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of server 110, entity server 140, entity 150, node device 160, and/or server 168.

As shown, server 110 includes one or more artifacts 114, an event log queue 118, and a file queue 119. Artifacts 114 may include one or more binaries (e.g., a computer file that is not a text file), including representative file 116, and metadata 117 corresponding to the file 116. The artifacts may correspond to one or more package types. For example, a first artifact may correspond to a first package type, such as Maven, and a second artifact may correspond to a second package type, such as Bower. Alternatively, all artifacts may correspond to a single package type, such as Docker. In some implementations, each federated software repository supports a single package type, and devices such as server 110 may be members of multiple federated software repositories that support different package types. Additionally, some federated software repositories may be general software repositories that can contain multiple types of artifacts. Metadata 117 may be associated with file 116 and may include information corresponding to individual files (e.g., file 116 is a single file) or groups of files (e.g., file 116 represents multiple files). In some implementations, metadata 117 is lightweight information that allows searching for and identification of a corresponding artifact or file (e.g., artifacts 114 including file 116). For example, metadata 117 may include searchable information such as properties, modification dates, creation dates, locations, checksums (e.g., checksums of individual files or artifacts, checksums of a group or release of artifacts, etc.), or the like. Artifacts 114 (e.g., file 116 and metadata 117) may make up one or more software releases or software packages that are stored at server 110 as part of a federated software repository with other devices (e.g., server 168) for retrieval or distribution to one or more node devices (e.g., node device 160). Event log queue 118 may be configured to store one or more entries indicating operations performed on artifacts 114 by server 110, and event log queue 118 may be used to initiate transmission of metadata to other members (e.g., server 168) of the federated software repository, as further described herein. File queue 119, which may also be referred to as a file provider queue or a federated binary provider queue, may be configured to store one or more entries indicating operations to be performed to import (e.g., pull) files from other members or to send (e.g., push) files to other members as repository update operations, as further described herein.

Network 120, such as a communication network, may facilitate communication of data between server 110 and other components, servers/processors, and/or devices. For example, network 120 may also facilitate communication of data between server 110 and one or more data sources 130, entity server 140, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources 130 may include one or more reciprocities of artifacts, such as open source artifacts, vulnerability data, and/or license data, as illustrative, non-limiting examples.

Entity server 140 may include one or more servers which entity 150 uses to support its operations. In some implementations, entity server 140 may support a development process 142 that includes multiple development stages for generating software for a software release. In such implementations, entity 150 includes or is configured to generate (or initiate generation of) a software release. For example, artifact 114 (e.g., one or more artifacts or files) may correspond to a build job generated by a continuous integration/continuous delivery (CI/CD) pipeline. In some implementations, after performance of development process 142, entity 150 provides artifact 114, or software information indicating artifact 114, to server 110. In other implementations, entity 150 provides a query and/or one or more parameters for a query which is performed by server 110 to generate the software information at server 110. To illustrate, entity 150 may initiate a query by server 110 to identify one or more artifacts or files corresponding to a particular build job identifier. The software information may be used to generate a software release.

Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

Node device 160 may include artifact 114 (e.g., one or more artifacts). Software (e.g., packages) hosted at node device 160 may be part of a software release which is a secure and immutable collection of software packages that make up a software release. For example, node device 160 may receive a software release, including artifact 114, as part of a distribution of the software release. Additionally or alternatively, node device 160 may interface with a member (e.g., server 168) of a federated software repository using a repository client 162 to download, modify, add, delete, or perform other operations to software stored at the federated repository, such as artifact 114.

In some implementations, node device 160 may include or correspond to entity 150. Although system 100 is shown as having one node device 160, in other implementations, the system 100 may include multiple node devices (e.g., 160). Node device 160 may include a data center, a point-of-sale device, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a wearable device, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, an augmented reality (AR) device, a virtual reality (VR) device, an extended reality (XR) device, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, node device 160 may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system. In some implementations, server 168 may be configured to operate as a part of a federated or shared software repository (e.g., a repository server) that is linked to server 110 (e.g., via network 120). For example, server 168 may include artifacts 164 (e.g., one or more binaries and corresponding metadata, similar to file 116 and metadata 117), an event log queue 166, and a file queue 167, similar to server 110. Event log queue 166 may be configured to store entries that indicate operations performed by server 168 to artifacts 164 and file queue 167 may be configured to store entries indicating operations to be performed to import (e.g., pull) files from other members or to send (e.g., push) files to other members as repository update operations, as further described herein. Server 110 and server 168 may execute different environments while sharing artifacts (e.g., to operate as members of a federated repository at multiple different geographic locations). For example, artifacts 114 and artifacts 164 may be the same artifacts other than any modifications made by server 110 or server 168 that have yet to be fully propagated to the other repository server and/or any device or environment-specific indexing metadata. In some implementations, server 168 may be located at a different location than repository server 110 to support multi-site software development using the federated software repository. As a non-limiting example, repository server 110 may be located in Israel and repository server 168 may be located in the United States to enable sharing of artifacts between teams located in the two countries.

With respect to user equipment 170, user equipment 170 may include one or more processors 172, memory 174, a communication adapter 176, an input/output (I/O) adapter 178, a display adapter 180, a user interface adapter 182, and a bus 184. As shown, each of one or more processors 172, such as a central processing unit (CPU), memory 174, communication adapter 176, I/O adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of one or more processors 172 so long as one or more processors 172, whether directly or indirectly, support the operations described herein. One or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some aspects, server 110 may be accessed via an online portal. I/O adapter 178 may couple user equipment 170 to one or more storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain aspects, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, wearable devices, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can comprise a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, smartphone, wearable device, or other similar end user computing device. Users can interact with server 110 (and/or server 168) using a device via one or more networks, such as network 120, which itself can comprise one or more of a local intranet, a Local Area Network (LAN), a Wide Area Network (WAN), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
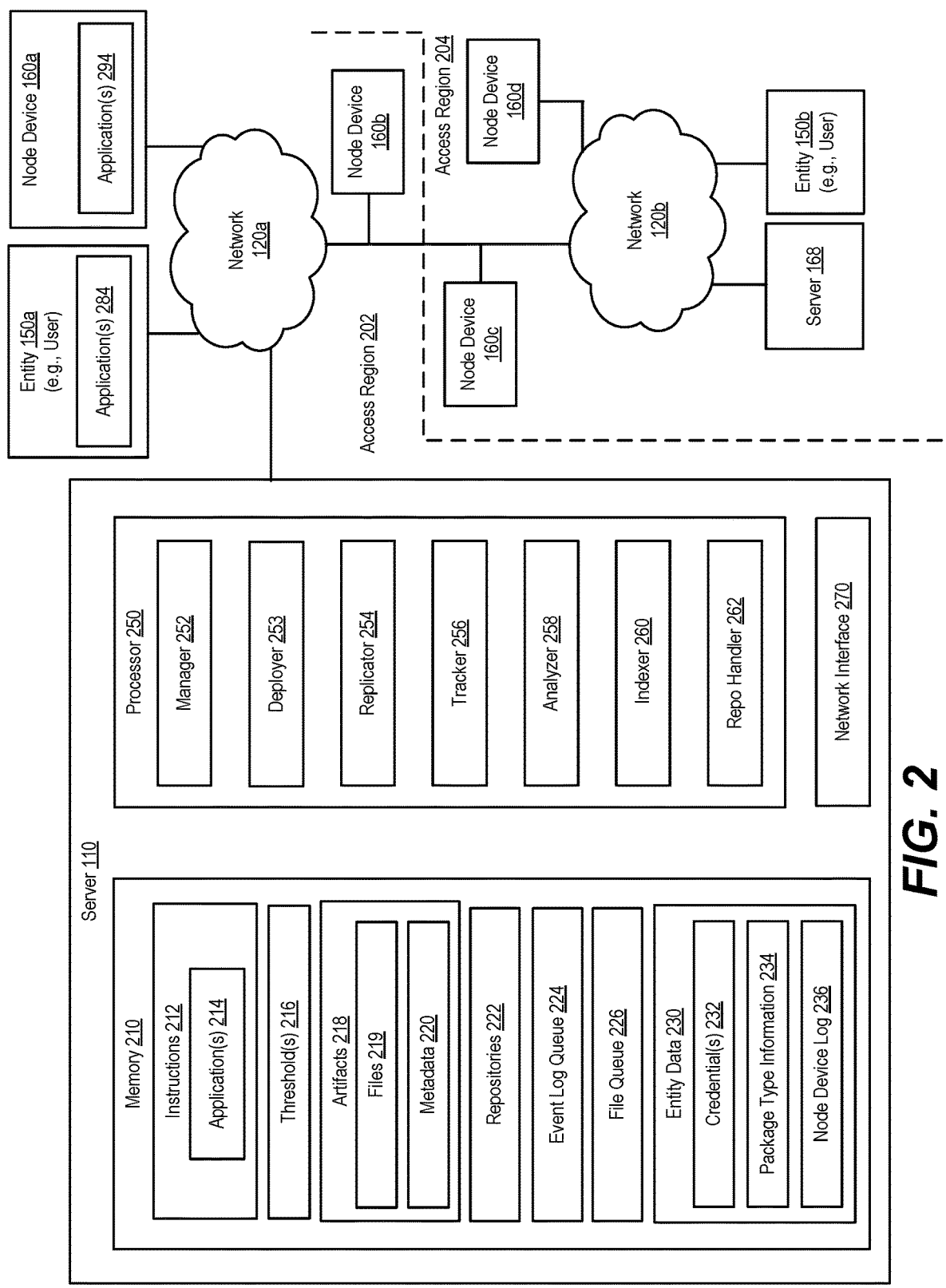
FIG. 2 is a block diagram of another example of a system for managing a federated software repository.

Referring to FIG. 2, a block diagram of a system for managing a federated software repository across multiple devices according to one or more aspects is shown as a system 200. System 200 may include or correspond to at least a portion of system 100. System 200 includes server 110, networks 120*a*, 120*b*, entities 150*a*, 150*b*, node devices 160*a*, 160*b*, 160*c*, 160*d*, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan), as a non-limiting example. Although described in the context of a software distribution system, in other implementations, the federated software repositories described herein may be implemented in systems that are not configured to distributed software releases, and as such, one or more components of system 200 (or elements of particular components) are optional.

As shown, server 110 is included in first region 202 and server 168 is included in second region 204. Server 168 may be a repository server and may include or correspond to server 110. In some implementations, server 110 and server 168 may be included in a universal artifact management system, and server 110 and server 168 may be members of a federated software repository (e.g., a shared, multi-device software repository). Networks 120*a*, 120*b* may include or correspond to network 120 of FIG. 1. Each of the entities 150*a*, 150*b* may include or correspond to entity 150 of FIG. 1. In some implementations, a first entity 150*a* and a second entity 150*b* may be part of the same group, company, etc., or may be part of different groups, companies, etc. Each of node devices 160*a*, 160*b*, 160*c*, 160*d* may include or correspond to node device 160 of FIG. 1. In some implementations, each of node devices 160*a*, 160*b*, 160*c*, 160*d* corresponds to the same entity. In other implementations, at least one node device of node devices 160*a*, 160*b*, 160*c*, 160*d* corresponds to another entity.

Server 110 may include a memory 210 (e.g., one or more memory devices), one or more processors 250, and a network interface 270. Network interface 270 may be configured to be communicatively coupled, via one or more networks (e.g., 120*a*, 120*b*) to one or more external devices, such as one or more entities (e.g., 150*a*, 150*b*), one or more node devices (e.g., 160*a*, 160*b*, 160*c*, 160*d*), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, thresholds 216, artifacts 218, repositories 222, event log queue 224, file queue 226, and entity data 230. For example, memory 210 may store instructions 212, that when executed by one or more processors 250, cause the processor 250 to perform functions, methods, processes, and/or operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150*a* and application 294 at node device 160*a* are configured to enable entity 150*a* and node device 160*a* to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to analyzer 258.

In some implementations, memory 210 includes multiple memories accessible by one or more processors 250. In some such implementations, one or more of the memories may be external to server 110. To illustrate, at least one memory may include or correspond to a database accessible to server 110, such as a database that stores one or more thresholds 216, artifacts 218, repositories 222, event log queue 224, file queue 226, entity data 230, or any combination thereof. In some implementations, memory 210 may include or be coupled to cloud storage such that one or more thresholds 216, one or more of artifacts 218, repositories 222, event log queue 224, file queue 226, and/or entity data 230 is stored at a cloud storage location and accessible by server 110.

Thresholds 216 may include or correspond to one or more thresholds, such as a time period threshold, a size threshold, a processing resource availability threshold, a network congestion threshold, etc. Artifacts 218 may include or correspond to artifacts 114 of FIG. 1. Artifacts 218 may include files 219 (e.g., one or more binaries) and metadata 220. Metadata 220 may include metadata for artifacts 218, metadata for application 214, metadata for one or more files (e.g., 219), metadata for one or more software releases or software packages that include one or more of artifacts 218, or any combination thereof. Metadata for an artifact (e.g., 114 or 218) may include a file name, a file size, a checksum of the file, and/or one or more properties that annotate the artifact, such as when the artifact was created by a build, a build job name, an identifier of who initiated the build, a time the build was initiated, a build agent, a CI server, a build job number, and/or a quality assurance test passed indicator, as illustrative, non-limiting examples. Metadata for a software release or software package may include a release name, a size, a checksum of an entirety of the files, and/or one or more properties that annotate the software release. Additionally or alternatively, metadata 220 may include searchable information such as properties, modification dates, creation dates, locations, checksums (e.g., checksums of individual files or artifacts, checksums of a group or release of artifacts, etc.), or the like. Repositories 222 may include or correspond to on-device portions of one or more federated repositories of which server 110 is a member. Repositories 222 may include corresponding repositories for a single federated repository or multiple different federated repositories of which server 110 is a member, and one or more of artifacts 218 (e.g., files 219 and/or metadata 220) may be included in the repositories. In some implementations, repositories 222 may include local repositories, virtual repositories, remote repositories, or any combination thereof.

Event log queue 224 may be configured to store entries that indicate operations performed by server 110 to artifacts associated with the federated software repository and that may trigger sending of metadata to other members of the software repository to facilitate real time or near-real time updates at the other members (e.g., repository servers). For example, if a new artifact is added to repository 222, an entry may be added to event log queue 224 that indicates that the new file has been added and that corresponding metadata is to be sent to the other members. The metadata operations indicated by entries in the event log queue 224 may be performed in response to the addition of the entries (e.g., sending the metadata may be event-based), or the entries in event log queue 224 may be performed based on polling the event log queue 224. As described further herein, in some implementations, metadata corresponding to one or more events in event log queue 224 may be aggregated with metadata corresponding to events in event log queues associated with other federated software repositories for sending of aggregated metadata. In some implementations, entries are only added to event log queue 224 if corresponding metadata operations are to be performed (e.g., entries are not added based on metadata received from other members). Alternatively, entries may be added to event log queue 224 based on operations performed by server 110 or corresponding to metadata received from other members. File queue 226 may be configured to store entries that indicate operations to be performed by server 110 to facilitate mirroring of artifacts 218 from other members (e.g., repository servers) at server 110. For example, if server 110 receives metadata from another member that indicates that the other member has added a new file to the federated software repository, an entry may be added to file queue 226 that indicates to import the new file from the other member (e.g., server 168) as a repository update operation. In some implementations, file queue 226 may be configured to store entries in accordance with a pull scheme, in which members that receive updates indicating new or modified files store entries in respective file queues to import (e.g., pull) the file from the members from which the metadata is received. In some other implementations, file queue 226 may be configured to store entries in accordance with a push scheme, in which members that send metadata indicating changes made by the members to the federated software repository store entries in respective file queues to propagate (e.g., push) the files to the other members. For example, if an existing one of artifacts 218 is modified by server 110 in repositories 222, an entry may be added to file queue 226 that indicates to provide the modified file to other members of the federate software repository. The operations indicated by entries stored in file queue 226 may be performed as repository update operations during a designated sync time period or during asynchronous synching, such as by performing background operations during a time period of less congestion at networks 120a and 120b or of reduced processing at server 110, as further described herein. In some other implementations, one or more operations corresponding to entries in file queue 226 may be performed on-demand (e.g., based on a synch command), as further described herein.

Entity data 230 may include data associated with one or more entities. For example, entity data 230 may include or correspond to one or more of entity 150a, 150b. Entity data 230 may include one or more credentials 232, package type information 234, and a node device log 236. Credentials 232 include login information to enable one or more users and/or one or more entities to access server 110. Additionally, or alternatively, credentials 232 may include security or authentication information, such as a private key, a public key, and/or a token of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, GitLFS, Go, Helm, Maven, npm, NuGet, Opkg, P2, PUP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.)

installed at one or more node devices, or any combination thereof, as illustrative, non-limiting examples. In some implementations, node device log 236 may indicate a list of target nodes at which one or more security objects are to be synchronized or software release 115 is to be deployed.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions described herein. As shown in FIG. 2, in some implementations, server 110 (e.g., processor 250) may include a manager 252, a deployer 253, a replicator 254, a tracker 256, an analyzer 258, an indexer 260, and repo handler 262 (e.g., a repository handler). In some implementations, processor 250 may include one or more modules. For example, each of manager 252, deployer 253, replicator 254, tracker 256, analyzer 258, indexer 260, and repo handler 262 may include or correspond to one or more modules. In some implementations, server 110 (e.g., processor 250 or modules 252, 253, 254, 256, 258, 260, 262) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260, 262) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150a) to manage one or more other components/modules (e.g., 253, 254, 256, 258, 260, 262) of processor 250. Additionally, or alternatively, manager 252 may enable storage of and/or access to one or more of artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150a) to monitor and control a first instance of a user account (corresponding to first region 202) and a second instance of the user account (corresponding to second region 204). For example, the entity (e.g., 150a) may be able to see which services (e.g., 253, 254, 256, 258, 260) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., processor 172 of FIG. 1 or processor 250) to enable a user (e.g., 150a) to manage one or more other components/modules (e.g., 253, 254, 256, 258, 260) of processor 250, as described herein.

Deployer 253 may be configured to perform a software release distribution via a hierarchical network including multiple devices configured to perform managed P2P communications, as further described herein. For example, deployer 253 provides a secure and structured platform to distribute and release binaries as a single coherent release bundle to multiple remote locations and update them as new release versions are produced. A release bundle may include one or more files and/or release bundle information which includes or indicates a list of the one or more files (e.g., artifacts) to be included in the release bundle and metadata (e.g., properties) associated with the release bundle. For example, a software release may include file 116 (e.g., one or more files) and software release information which includes metadata 117 corresponding to the one or more files. The release bundle information may include, for each file of the bundle release, a checksum (of the file), metadata (corresponding to the file), or both. In some implementations, the release bundle also includes additional metadata (e.g., file name, file size, path to the file, etc.) corresponding to the release bundle, such as a release bundle name, a version number, a source identifier, description information, release data, and/or a size. Additionally, or alternatively, the software release information may include a signature (or other cryptography technique) to render the release bundle information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Additionally, or alternatively, a software release may be provisioned amongst one or more node devices (e.g., 160a, 160b, 160c, 160d). In some implementations, as part of the release flow, release bundles are verified and validated by the source and/or destination to ensure that they are signed correctly and safe to use. In some implementations, deployer 253 includes a deployer module that includes one or more routines, executable by one or more processors (e.g., the processor 172 of FIG. 1 or processor 250) to perform a software release distribution.

Replicator 254 may be configured to coordinate and provide one or more artifacts (e.g., one or more files) and/or metadata between two or more devices. For example, replicator 254 may coordinate transfer of one or more artifacts (e.g., one or more files) and/or metadata between server 110 and server 168, between server 110 and one or more of node devices 160a, 160b, 160c, 160d, or both. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160a, 160b, 160c, 160d). Additionally, or alternatively, replicator 254 may be configured to identify a difference between at least one file stored at a first device (e.g., server 110) and one or more files stored at a second device (e.g., server 168 or one of node devices 160a, 160b, 160c, 160d), and initiate transfer of at least one or more portions of a file to the second device. In some implementations, replicator 254 includes a replicator module that includes one or more routines, executable by one or more processors (e.g., the processor 172 of FIG. 1 or processor 250) to coordinate and provide one or more artifacts (e.g., one or more files) and/or metadata between two or more devices.

Tracker 256 may be configured to track one or more artifacts, metadata, one or more release bundles, or any combination thereof deployed or attempted to be deployed to a node device, such as one or more of node devices 160a, 160b, 160c, 160d, a server (e.g., server 110, 168), or both. In some implementations, tracker 256 includes a tracker module that includes one or more routines, executable by one or more processors (e.g., the processor 172 of FIG. 1 or processor 250) to track one or more artifacts, metadata, one or more release bundles, or any combination thereof deployed or attempted to be deployed to a node device, such as one or more of node devices 160a, 160b, 160c, 160d, and/or one or more servers (e.g., server 110, 168).

Analyzer 258 may be configured to analyze one or more artifacts (e.g., 218) and/or metadata (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1 or processor 250) to analyze one or more artifacts (e.g., 218) and/or metadata (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate metadata (e.g., 220), such as metadata defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1 or processor 250) to provide an indexing capability, including maintaining interdependencies and information, for one or more package types.

Repo handler 262 may be configured to enable server 110 to participate in one or more federated software repositories. For example, repo handler 262 may be configured to manage and maintain queues used to participate in a federated software repository, such as event log queue 224 and file queue 226, and to manage artifacts in repositories 222 based on operations performed by server 110 or by other members of corresponding federated software repositories, as indicated by received metadata. In some implementations, repo handler 262 includes a repo handler module that includes one or more routines, executable by one or more processors (e.g., the processor 172 of FIG. 1 or processor 250) to enable server 110 to participate in one or more federated software repositories.

In some implementations, one or more of modules 252-262 may be optional. For example, in some implementations in which server 110 is configured to distribute software releases but not otherwise manage artifacts or files, processor 250 may include deployer 253 and manager 252. In some other implementations, processor 250 may include multiple or all of modules 252-262, and server 110 may be configured to deploy software releases in addition to operate as a universal artifact repository.

Figure 3:
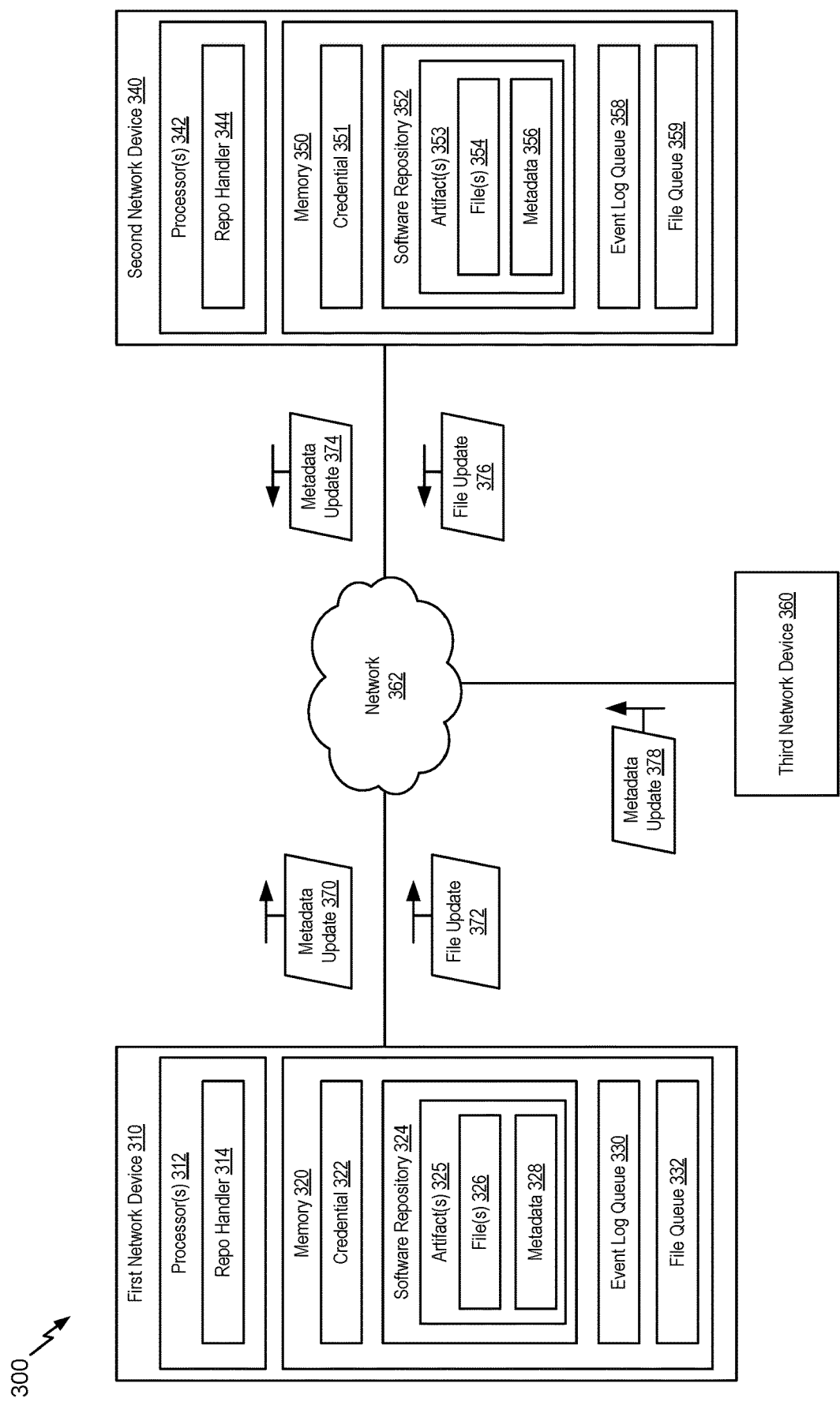
FIG. 3 is a block diagram of another example of a system for managing a federated software repository.

Referring to FIG. 3, a block diagram of a system for managing a federated software repository according to one or more aspects is shown and designated 300. System 300 includes first network device 310, second network device 340, third network device 360, and network 362. Network devices 310, 340, and 360 may include or correspond to servers (e.g., repository servers) configured to store software packages and releases for use by user, client, or node devices communicatively coupled to the network devices 310, 340, and 360. Network devices 310, 340, and 360 are communicatively coupled (e.g., linked) together via network 362 (e.g., one or more networks) and configured to support a one or more group software repositories that are editable by any of the network devices 310, 340, and 360 (e.g., a federated repository). System 300 may include or correspond to at least a portion of system 100 and/or system 200. For example, in some implementations, network devices 310, 340, and 360 may include or correspond to server 110 or repository server 168, as described with reference to FIGS. 1 and 2. In some other examples, system 300 may include a different number of network devices than illustrated in the example of FIG. 3.

First network device 310 includes one or more processors 312 and a memory 320. One or more processors 312 may include or correspond to processors 250, and memory 320 may include or correspond to memory 210 of FIG. 2, in some implementations. One or more processors 312 include repo handler 314 that is configured to support mirroring of files across the federated software repository. For example, repo handler 314 may be configured to maintain one or more queues, generate or modify and share metadata, request (e.g., pull) or propagate (e.g., push) one or more files (e.g., binaries) with other devices, automatically identify errors and/or trigger synchronization operations, support secure communications, automatically identify configuration changes or conflicts, perform conflict resolution, support full synchronizations, support checksum-based repositories, and support container and/or package indexing to enable first network device 310 to participate in a federated software repository with one or more other members (e.g., network devices 340, 360). In some implementations, repo handler 314 includes or corresponds to repo handler 262 of FIG. 2. Memory 320 includes (e.g., is configured to store) a credential 322, a software repository 324, an event log queue 330, and a file queue 332. Credential 322 may be used to establish trust between first network device 310 and other members of the federated software repository. In some implementations, credential 322 may include a public key that is shared by devices of the federated software repository and is used to certify one or tokens used with reference to the federated software repository. In some such implementations, one or more devices within the federated software repository may be configured to provide credential 322 (e.g., the public key) to a device upon successful completion by the device of a joining process, which may optionally include validation of the device and/or users of the device to establish a circle of trust. In some other implementations, credential 322 may include or correspond to one or more tokens used to perform a handshake process and to perform repository operations. To illustrate, the handshake process may include first network device 310 generating a short-living, scoped "join token" for a manual handshake, and first network device 310 may provide the join token to the other members (e.g., network devices 340, 360) of the federated software repository for installation and/or storage at the other members. The join token is used to create a "durable token," that is more durable (e.g., exists for a longer time period) than the join token, but is more limited in scope, for example the durable token may be limited in scope to being used to create shorter-living work tokens. The work tokens may be included in communications between members of the federated software repository to prove membership, and the work tokens may expire in a shorter time period than the durable token. Additionally, the durable token may be continually or periodically refreshed, such as by completing another handshake process or generation and exchange of another join token between the members of the federated software repository. As a particular, non-limiting example, the join token may have a lifetime of a few minutes to a few hours, the durable token may have a lifetime of a few weeks to a month, and each work token may have a lifetime of a few hours to a day. In some other implementations, first network device 310 may be configured to use mission control to automatically perform the handshake process, including obtaining credential 322.

Software repository 324 may include one or more artifacts 325, which in some implementations include or correspond to artifacts 114 as described with reference to FIG. 1 or artifacts 218 as described with reference to FIG. 2. As shown in FIG. 3, artifacts 325 may include one or more files 326 (e.g., binaries) and metadata 328 that corresponds to the files 326 and/or to the artifacts 325. In some implementations, some or all of the files 326 may form one or more software packages or software releases, and as such, may have common permissions or settings, linked interdependencies, share a common executable file package, or a combination thereof. Metadata 328 may include file-specific metadata, software release-specific or software package-specific (e.g., group-specific) metadata, or both. For example, metadata 328 may include names, dates, sizes, paths, authors, authorizations, validation information, error correction, other information, or a combination thereof, that corresponds to one or more individual files, that corresponds to one or more software releases or software packages (e.g., an entirety of multiple files), or a combination thereof. In some implementations, metadata 328 includes lightweight information that enables searching for and identification of corresponding files and/or artifacts (e.g., artifacts 325 and/or files 326), and metadata 328 has a small network signature such that it may be sent to other members of the federated software repository in real time or near-real time. To illustrate, metadata 328 may include searchable information such as properties corresponding to files 326, modification dates corresponding to files 326, creation dates corresponding to files 326, locations of files 326, checksums corresponding to files 326, other searchable information, or a combination thereof. As such, updating the lightweight metadata at other members of the federated software repository may enable fast (e.g., nearly immediate) updates, which reduces the likelihood for conflicts and speeds up the replication process by allowing sequential metadata updates and parallel file (e.g., binary) imports, as further described herein. In some implementations, metadata 328 may include or correspond to metadata 117 as described with reference to FIG. 1 or metadata 220 as described with reference to FIG. 2.

Event log queue 330 may include a queue (or other data structure) that is configured to store entries representing a log of artifact changes to the federated software repository at first network device 310. For example, in response to (e.g., immediately after) a change to artifacts 325 stored at software repository 324, an entry may be added to event log queue 330 representing the change and an event handler (e.g., repo handler 314) may be triggered based on the entry. In some implementations, the event handler is event-based and polled. Alternatively, the event handler may be event-based and not polled, polled and not event-based, or managed in some other manner that supports real-time or near-real time event handling. In some implementations, first network device 310 includes a markers table (not shown in FIG. 3). The marker table may include one or more rows and at least two columns: a feature column and a marker column. An illustrative entry includes a name of a feature (e.g., a process) that is configured to track changes in event log queue 330 and marker (e.g., a pointer) that points to a row in the event log queue 330 that corresponds to the last change that was handled by that process. In some implementations, repo handler 314 may be configured to perform periodic cleanup of event log queue 330. For example, the periodic cleanup may include identifying events in event log queue 330 that are older than a threshold age, which may be a preconfigured parameter or a user-configurable parameter, and deleting any entries in the event log queue 330 that are older than the threshold age. In the event that one or more entries are deleted, repo handler 314 may take one or more actions, such as notifying a user of possible data loss and/or triggering an automatic full synchronization of first network device 310 with the federated software repository.

File queue 332, also referred to as a file provider queue or a federated binary provider queue, may include a queue (or other data structure) that is configured to store entries representing file-related operations to be performed as repository update operations. For example, the entries in file queue 332 may indicate to import a new file (or multiple files) that are added to the federated software repository by another member (as indicated by metadata received from the other member). In some implementations, file queue 332 is configured such that entries are retrieved for processing and performance in a first in, first out (FIFO) order (e.g., an order of storage). Entries within file queue 332 may be retrieved for processing and performance of the corresponding operations during asynchronous synching and/or a designated sync time period, as further described herein, which may be referred to as "lazy importing." In some implementations, on-demand or "binary importing" may also be supported, such that a file indicated by an entry in file queue 332 may be imported based on a request from a process that uses the file prior to performance of repository update operations indicated by the entries in file queue 332. If a file corresponding to an entry is imported (or otherwise received or sent) prior to the repository update operations, repo handler 314 may remove the corresponding entry or entries from file queue 332 to prevent redundant file transfers (e.g., simultaneous transfers or transfers of the same file at different times). In some implementations, prior to retrieval of entries from file queue 332, a conflict resolution procedure, a deduplication procedure, or both, may be performed, as further described herein.

Second network device 340 and third network device 360 include similar components to first network device 310. To illustrate, second network device 340 includes one or more processors 342 and a memory 350. One or more processors 342 includes repo handler 344, which may be similar to or correspond to repo handler 314. Memory 350 includes (e.g., is configured to store) credential 351 (which may be the same as or different than credential 322), software repository 352, event log queue 358, and file queue 359. Software repository 352 may store one or more artifacts 353 that include one or more files 354 and metadata 356 that corresponds to files 354 and/or artifacts 353. When software repository 324 at first network device 310 and software repository 352 at second network device 340 are fully synchronized, files 326 and files 354 include the same set of files, and metadata 328 and metadata 356 include the same metadata, other than container or package specific indexing data, as further described herein. Event log queue 358 is configured to store entries representing changes to artifacts stored at second software repository 352 of second network device 340, and file queue 359 is configured to store entries representing file-based operations to be performed as repository update operations, similar to event log queue 330 and file queue 332, respectively. Third network device 360 includes similar components (not shown for convenience).

During operation of system 300, network devices 310, 340, and 360 may communicate via network 362 and form a federated software repository such that each of network devices 310, 340, and 360 initially store copies of the same artifacts (e.g., copies of the same software releases/software packages) including files and corresponding metadata. Network devices 310, 340, and 360 may be configured as a mesh (e.g., a mesh network), such that there is no centralized device that controls members (e.g., devices) of the federated software repository. Instead, devices may join or leave the federated software repository at different times and each member of the federated software repository may perform one or more operations to enable management and operation of the federated software repository across multiple devices. In some implementations, the network devices 310, 340, and 360 are located in different geographic locations and each network device is configured to operate as a software repository server for client devices in the respective geographic location. As a non-limiting example, first network device 310 may be located in and may support client devices in New York City, US, second network device 340 may be located in and may support client devices in London, England, and third network device 360 may be located in and may support client devices in Tokyo, Japan. In other examples, network devices 310, 340, and 360 may be located in other geographic regions. Because the network devices 310, 340, and 360 are configured as a mesh, no particular device or corresponding geographic location has a higher priority than other network devices or corresponding geographic locations (e.g., the federated software repository is "location agnostic").

As software development is performed, clients (e.g., users) may make modifications to one or more artifacts at the various software repositories of the members of the federated software repository. For example, a client of first network device 310 may initiate modifications to one or more artifacts stored at software repository 324, a client of second network device 340 may initiate modifications to one or more artifacts stored at software repository 352, and a client of third network device 360 may initiate modifications to one or more artifacts stored at the software repository hosted at the third network device 360. The modifications may include creating and storing new artifacts, modifying existing artifacts, deleting existing artifacts, other modifications, or a combination thereof. For example, new artifacts may be stored as artifacts 325 at software repository 324, existing one or more of artifacts 353 may be modified at software repository 352, and a set of existing artifacts may be deleted at the software repository hosted by third network device 360. Changing the artifacts may include changing both the corresponding files and metadata. For example, first network device 310 may store new files as files 326 and store metadata corresponding to the new files as metadata 328 at software repository 324. As another example, second network device 340 may modify one or more of files 354 and a portion of metadata 356 corresponding to the modified files at software repository 352. As yet another example, third network device 360 may delete one or more files and corresponding metadata.

After an artifact change occurs, the respective repo handler may push an event (e.g., an entry) to a respective event log queue based on the artifact change. For example, repo handler 314 may add a first entry to event log queue 330, the first entry indicating addition of one or more of files 326 and a portion of metadata 328. As another example, repo handler 344 may add a first entry to event log queue 358, the first entry indicating modification of one or more of files 354 and a portion of metadata 356. In addition to adding entries to event log queues, the repo handlers may perform event handling for events indicated by entries in the event log queue. In some implementations, event handling performed by repo handlers is based on both polling and event-based, such that event handling is triggered immediately after a change to an artifact. Upon triggering of event handling, members of the federated software repository may send metadata updates to other members to indicate the artifact changes and to enable updating of metadata at the other members. For example, first network device 310 may, based on the entry in event log queue 330, send metadata update 370 to second network device 340 and third network device 360. Metadata update 370 includes the portion of metadata 328 that corresponds to the one or more of files 326 added to software repository 324. The event handler may collect all events for a specific member and send the corresponding metadata together as a single, aggregated metadata update to improve network efficiency. To illustrate, multiple sets of files may be added to a software repository of a member, triggering addition of entries for each set of files to the respective event log queue, and the event handling by this member may process each of these events and aggregate the corresponding metadata as a single metadata update that is sent to other members of the federated software repository. Target members may receive the metadata updates and persist the metadata at the respective repositories, and if the corresponding files do not exist locally, the target members may add an entry to a respective file queue (e.g., binary importing queue) for importing the files in addition to storing a respective placeholder file. For example, network devices 340 and 360 may store metadata update 370 (e.g., the new metadata) and one or more placeholder files in their respective software repositories, as well as adding entries to the respective file queues to import the missing files. To illustrate, second network device 340 may receive metadata update 370 and add the new metadata to metadata 356 and corresponding placeholder files (e.g., "empty blobs") to files 354 for each new file indicated by metadata update 370. The placeholder files may be used by the network devices when processing later modifications to the software releases/software packages stored in the respective software repositories, as further described herein. Additionally, second network device 340 may add an entry to file queue 359 to import the files corresponding to metadata update 370, as further described herein.

As another example of metadata updates, second network device 340 may, based on the entry in event log queue 358, send metadata update 374 to first network device 310 and third network device 360. Metadata update 374 includes the modified portion of metadata 356 due to the modification to the artifacts 353 by second network device 340. Network devices 310 and 360 may store metadata update 374 (e.g., the modified metadata) in their respective software repositories by overwriting the existing metadata corresponding to the same files for which metadata update 374 includes modified metadata. For example, first network device 310 may overwrite a portion of metadata 328 that corresponds to the modified files based on the metadata update 374. As another example, third network device 360 may send, based on an entry in an event log queue of third network device 360, metadata update 378 to first network device 310 and second network device 340. Metadata update 378 may include the metadata corresponding to the deleted files and/or an instruction or indicator to delete the metadata (and the corresponding files). Network devices 310 and 340 may process metadata update 378 (e.g., the instruction or indication of metadata to delete) and may delete the corresponding metadata from their respective software repositories. For example, first network device 310 may delete the portion of metadata 328 that corresponds to metadata update 378. Network devices 310 and 340 may also delete the corresponding files based on receipt of metadata update 378, or entries may be added to the respective file queues to indicate deletion of the corresponding files as part of repository update operations. In some implementations, determining whether a file indicated by a metadata update exists at a particular member is based on a checksum. To illustrate, the metadata for the artifacts may include checksums for each of the artifacts/files, and the metadata updates include checksums corresponding to the artifacts/files changed by the metadata update, and a member that receives a metadata update may compare the checksum(s) in the metadata update to checksums stored at the respective repository to determine if the files corresponding to the metadata update exist at the member. For example, first network device 310 may compare one or more checksums included in metadata update 374 to one or more checksums included in metadata 328 to determine whether corresponding files exist at software repository 324, or whether placeholder files are to be added.

In some implementations, sending metadata updates between members of the federated software repository may enable software repositories at the members to be at least partially updated in real time or near-real time (e.g., accounting for processing and transmission time of the metadata updates). As a non-limiting example, second network device 340 may be able to update metadata 356 to reflect the modification to metadata 328 and files 326 at first network device 310 in the amount of time it takes for first network device 310 to generate and send metadata update 370 and for second network device 340 to receive and process metadata update 370. Because metadata corresponding to files stored at the software repositories typically has a significantly smaller size and network signature than the files (e.g., binaries) themselves, the metadata updates may be propagated between members quickly, and in significantly less time than propagation of the files. The increase in speed provided by performing metadata updates instead of file updates may enable the members of the federated software repository to remain synchronized and reduce the likelihood of conflicts by different members of the federated software repository. To illustrate, because metadata update 374 is propagated in real time or near-real time, first network device 310 and third network device 360 may prevent additional modifications to the versions of the corresponding files stored at those devices instead of waiting for the modified files to be fully received before updating the respective repositories, which may result in multiple conflicting versions of the same files. Such conflicts may result in software release rollbacks, system lockdowns, or incompatible software at different client devices, any of which can result in errors, malfunctions, or downtime for an enterprise. Additionally, timestamp-based conflict resolution may be performed with respect to metadata updates and event log queues. For example, if a member of the federated software repository receives user input including a first modification of a file and a metadata update indicating a second modification to the same file, the member may compare timestamps of the two operations to determine how to modify the file. To further illustrate, if the first modification is associated with a timestamp that is earlier than a timestamp associated with the second modification, the member may perform the first modification, discard the received metadata update, and send a new metadata update indicating the first modification and the associated timestamp to other members of the federated software repository. The other members may similarly resolve any conflicts based on time stamps, including the member that originally sent the first metadata update determining to undo performance of the second modification, such as by a rollback operation or triggering a synchronization with the federated software repository. Additionally or alternatively, metadata transferred as metadata updates may not include an executable file package or container indexing information generated and stored by the member that sends the metadata update, as the existence of an artifact or binary at one member of the federated software repository does not guarantee that the artifact or binary exists at any other member. Thus, to avoid conflicts and raise conditions, each member of the federated software repository may be responsible for generating and maintaining its own indexing information for artifacts stored at that member, and such information is not included in the metadata that is shared as metadata updates. Conflict resolution may be optional, as synchronously sharing metadata updates may avoid most conflicts.

In addition to adding, deleting, or modifying metadata based on metadata updates received from other members of the federated software repository, each member may add entries to a respective file queue if the metadata update indicates files that do not exist (e.g., are not stored) at the member or if the metadata update files indicate modifications to files that exist (e.g., are stored) at the member. For example, responsive to receiving metadata update 370 and determining that the files corresponding to metadata update 370 are not included in files 354 (e.g., based on checksum comparisons), second network device 340 may add a first entry to file queue 359. The first entry indicates to import the files corresponding to metadata update 370 from first network device 310. As another example, responsive to receiving metadata update 374 and determining that the files corresponding to metadata update 374 are to be modified, first network device 310 may add a first entry to file queue 332. The first entry indicates to import the modified files corresponding to metadata update 374 from second network device 340. Third network device 360 may perform similar operations based on receiving metadata update 370 and metadata update 374. Because metadata update 378 sent by third network device 360 indicates to delete metadata and the corresponding files, first network device 310 and second network device 340 may not add entries to file queue 332 and file queue 359, respectively, and instead may delete the associated metadata and files from software repository 324 and software repository 352, respectively.

After adding entries to file queues, at a later time, the members of the federated software repository may perform repository update operations based on the entries in the file queues. To perform the repository update operations, network devices 310, 340, and 360 may retrieve entries from the respective file queue and process the entries to cause performance of the indicated operations. In some implementations, each member of the federated software repository may perform respective repository update operations concurrently with the other members (e.g., the members may perform the repository update operations in parallel). In other implementations, one or more members may perform repository update operations at member-specific times. In some implementations, the repository update operations may be asynchronously performed by members of the federated software repository. For example, first network device 310 may perform repository update operations based on detection of network congestion or latency at network 362 that is less than a threshold, based on detection of processor resource use at first network device 310 that is less than a threshold, based on a number of client devices connected to first network device 310 being less than a threshold, based on one or more other asynchronous trigger conditions, or a combination thereof. In some such implementations, the repository update operations may be performed as background operations of network devices 310, 340, and 360 (e.g., during performance of other operations or during idle or low power operating modes, as non-limiting examples). In some other implementations, the repository update operations may be performed during a designated update time period for the federated software repository. For example, the designated update time period may be based on common parameters to all of network devices 310, 340, and 360, and may be communicated to members upon successful joining of the federated software repository. To support a common designated update time period, members of the federated software repository may synchronize clocks, such as upon joining the federated software repository, periodically, or the like. The designated update time period may occur (or reoccur) periodically, such that periodic repository update operations occur throughout the federated software repository.

Members of the federated software repository may perform repository update operations (e.g., file sharing operations) based on entries in the respective file queue to enable file sharing across the federated software repository. The file updates may include sending newly added or modified files at one member of the federated repository to the other members, based on receiving requests (e.g., pull or import instructions) from the other members, or based on entries the member's file queue in push-based implementations. In some implementations, in addition to the above-described bi-directional repository updates, members of the federated software repository may be configured to perform one or more types of unidirectional repository updates. As non-limiting examples, unidirectional repository updates may include event-based push updating, event-based pull updating, metadata first synchronization, metadata first event-based updating, or any combination thereof. Event-based push updating may include a member initiating performance of a push operation to send a file to other members responsive to a local event (e.g., a change to an artifact). Event-based pull updating may include a member initiating performance of an import operation to receive a most recent version of a file from another member responsive to a local event (e.g., a user request, a request for the file from another application or process, an automatically detected event, etc.). Metadata first synchronization may include a member initiating a full synchronization operation with other members that first imports all metadata and then imports the corresponding files (e.g., potentially as backup operations, as described above). Metadata first event-based updating may include a member importing (or sending) metadata from (or to) another member based on a local event and then importing (or sending) the corresponding files, such as based on a request from the other member or during backup operations.

As an example of performing repository update operations based on entries in file queues, upon triggering of asynchronous repository updating (or during a designated update time period), second network device 340 (e.g., repo handler 344) may access the first entry in file queue 359 and, based on the first entry indicating that files corresponding to metadata update 370 are to be imported, second network device 340 may import the files from first network device 310. In some implementations, importing may include sending a request for the files to a member that stores the files and from which a corresponding metadata update has been received. Responsive to the request (e.g., the import or pull) from second network device 340, first network device 310 may send file update 372 to second network device 340. File update 372 includes the new files added to software repository 324 (e.g., to files 326) that correspond to and triggered sending of metadata update 370. Second network device 340 may receive file update 372 and store the new files to software repository 352, such as by overwriting the previously-stored placeholder files generated and stored based on metadata update 370. Third network device 360 may perform similar operations to import the same files from first network device 310. As another example, first network device 310 (e.g., repo handler 314) may access the first entry in file queue 332 and, based on the first entry indicating that files corresponding to metadata update 374 are to be imported, first network device 310 may import the files from second network device 340, such as by sending a request/pull instruction. Responsive to the request, second network device 340 may send file update 376 to first network device 310. File update 376 includes the modified files stored at software repository 352 that correspond to and triggered sending of metadata update 374. First network device 310 may receive file update 376 and may overwrite corresponding files at software repository 324 with the modified files included in file update 376. Third network device 360 may perform similar operations to import the same files from second network device 340. Because metadata update 378 from third network device 360 indicated deletion of metadata (and corresponding files), in some implementations, there are no entries in files queues 332 and 359 to be performed as deletion may occur upon receipt of metadata update 378 and without any file transfer from third network device 360. Alternatively, if files or other information is required to perform the deletion, corresponding file transfer operations may be performed similar to those described above. The above-described examples are for a federated software repository configured according to an import/pull scheme. In other implementations, the federated software repository may be configured according to a push scheme. In such implementations, members may add entries to file queues when local artifact changes occur, and the repository update operations performed based on the file queue entries may include push operations (e.g., sending files without receiving requests or pull commands). For example, responsive to adding one or more files to files 326, first network device 310 (e.g., repo handler 314) may store an entry in file queue 332 that indicates addition of the one or more files, and first network device 310 may retrieve the entry and send the one or more files as file update 372 during repository update operations without receiving any requests from second network device 340 or third network device 360.

In some implementations, in addition to performing repository update operations based on entries in the file queues, either asynchronously or at a designated update time period, file updates may be performed based on client requests, trigger conditions, requests from other applications or processes that use the artifacts stored in the federated software repository, requests from other members within the federated software repository, or a combination thereof. For example, another process at first network device 310 may attempt to access the files that correspond to metadata update 374 received from second network device 340. In response to the files being accessed, first network device 310 may send a request for the files to second network device 340 to cause importing of the modified files, even during times of network congestion or high processor use (e.g., during a time period in which repository update operations are not being performed). Responsive to the request, second network device 340 may send file update 376 to first network device 310, and first network device 310 may overwrite the placeholder files with the received files, as described above. Additionally, first network device 310 may remove the entry in file queue 332 corresponding to importing the modified file such that the modified file is not redundantly imported during performance of the repository update operations. Additionally or alternatively, the federated software repository may support on synchronous or asynchronous full synchronization. For example, when a new member joins the federated software repository, as part of the joining process the new member may perform a full synchronize operation to import all artifacts stored at the federated software repository. As another example, members may be configured to perform periodic synchronizations to prevent any errors due to unexpected network disconnection or other factors, and such periodic synchronizations may be scheduled to be performed daily, weekly, monthly, or the like, either at particular predesignated times or when one or more asynchronous trigger conditions are met. As another example, in response to automatic detection of one or more errors or other trigger conditions by the member, the member may automatically initiate a full synchronization operation. In response to a full synchronization, the member may initiate importing of all artifacts stored at the federated software repository from another member, initiate sending of current versions of all artifacts stored at the member to another member, or both. In some implementations, the member may perform both provide local artifacts to other members and import artifacts from other members, handling any conflicts based on timestamps. In some other implementations, the member may import current versions of all artifacts from another member, and any conflicts with existing artifacts may be indicated for error handling prior to overwriting the existing artifacts with the imported artifacts in order to synchronize the artifacts stored at the member with those stored at the other members. As an example, based on a synchronization command at software repository 324, first network device 310 may request (e.g., import/pull) copies of all artifacts stored at software repository 352 from second network device 340. Performance of a full synchronization may cause the member to clear all entries stored in the respective event log queue and file queue. Supporting full synchronization operations may enable support of automatic system recover at members of the federated software repository. To illustrate, a member (e.g., the member's repo handler) may perform periodic cleanup of the event log queue, as described further above, and in response to identifying any potential data loss during the cleanup, the member may automatically initiate a full synchronization to protect against any data loss. Additionally or alternatively, members may be configured to periodically identify discrepancies between stored artifacts and artifacts at other members of the federated software repository, such as comparing checksums or other techniques for identifying discrepancies, and the member may determine to cure the discrepancies by initiating a full synchronization or otherwise initiating import of the identified files or by pushing the local version of the identified files and/or triggering the other members to perform a full synchronization. In some implementations, the selected operations to cure the discrepancies may be determined automatically based on one or more parameters or may be selected based on user input. Additionally or alternatively, a user may manually trigger a full synchronization by a member of the federated software repository.

In some implementations, prior to performing the repository update operations, members may perform error handling, deduplication, or both, based on entries in the respective file queues. The deduplication operations may include removing entries corresponding to operations that are made redundant by later events or entries. As an example, if a file queue includes an entry indicating to import a new file from another member and a later entry that indicates to import a modified version of the same file from the same member, a deduplication operation may remove the earlier entry from the file queue to prevent performance of a file transfer that is made redundant by a later file transfer (e.g., importing an original copy of the file when a modified version of the same file will also be imported). As another example, if the file queue includes an entry to import a file, and a later received metadata update indicates to delete the same file, a deduplication operation may remove the entry to import the file to prevent importing a file that is to be deleted without any additional modifications or use. In some implementations, complex deduplication may include combining two events instead of merely discarding or deleting one. For example, a first event may include modifying properties of an artifact, and a second event may include modifying the artifact itself. However, the property modification event may contain additional data that is not included in the artifact modification event. To perform deduplication in this example, the member may construct a new file update or other message that includes both the property modification (to the extent not contained in a corresponding metadata update) and the modified file, as opposed to simply deleting the event corresponding to the property modification due to the later modification of the artifact. Error handling may be performed by a member of the federated software repository for the respective event log queue, the file queue, or both. The queues may support block error handling with retry. For example, if first network device 310 detects an error in adding an entry to event log queue 330, first network device 310 may start a timer that, upon expiration, triggers first network device 310 to retry adding the entry to event log queue 330. In some implementations, the retry may be conditioned upon considerations of the relevance of the event, deduplication, event cancellation, event skipping, or a combination thereof. Similar operations may be performed with respect to adding entries to or retrieving and processing entries from file queue 332.

Although the example illustrated in FIG. 3 shows a single federated software repository supported by system 300, in some other implementations, system 300 may support multiple federated software repositories. As an example, one or more of network devices 310, 340, and 360 may be members of more than one federated software repository and therefore may be configured to store two or more distinct software repositories, and the software repositories may be managed and synchronized as described above. For example, network devices 310, 340, and 360 may be members of a first federated software repository, as shown in FIG. 3, network devices 310 and 340 may also be members of a second federated software repository, and network devices 310 and 360 may also be members of a third federated software repository. Each network device may separately manage and control artifacts stored in the different federated software repositories as though each network device were member of only a single federated software repository (e.g., metadata and file exchanges corresponding to artifacts stored in one federated software repository may not be propagated to artifacts stored in a different federated software repository), with the exception of aggregating metadata transferred as metadata updates. For example, if first network device 310 has a first metadata update to be sent to members of the first federated software repository and a second metadata update to be sent to members of the second federated software repository, first network device 310 may aggregate the first and second metadata updates to send an aggregated metadata update to second network device 340 because second network device 340 is a member of both the first and second federated software repositories. Supporting multiple federated software repositories at a single network device may enable the network device to act as a repository server for multiple different types of client devices, software developments, or the like. Different federated software repositories may be designated to store different software, such as software releases or software packages for different types of devices, different software releases, different file/artifact types, different subsets of clients or locations, or the like. As a non-limiting example, a first federated software repository may be designated for storage of software packages for a first device type (e.g., media playback devices) and a second federated software repository may be designated for storage of software packages for a second device type (e.g., IoT devices). Additionally or alternatively, federated software repositories may be configured for different types of mirroring. As an example, a federated software repository that includes two repository servers may be configured for 2-way mirroring between the two repository servers. As another example, a federated software repository that includes four repository servers may be configured with 2-way mirroring between a first repository server and a second repository server, 2-way mirroring between a third repository server and a fourth repository server, and 2-way mirroring between the first repository server and the fourth repository server. As yet another example, a federated software repository that includes three (or more) repository servers may be configured for 3-way (or more than 3-way) mirroring between the repository servers.

As described above, system 300 is configured to manage and support a federated software repository (e.g., one or more shared, multi-device software repositories). For example, system 300 supports mirroring of software packages (e.g., software releases), such as artifacts 325 or artifacts 353, to multiple network devices 310, 340, and 360 (e.g., repository servers) at different geographical locations, resulting in a managed, global federated software repository with full location transparency. Management of the federated software repository is distributed to the individual network devices 310, 340, and 360, such as via a mesh configuration, instead of by a server or other centralized management components, which results in a scalable and dynamic federated software repository. The federated software repository is site agnostic, such that first network device 310 may be located at a first geographic location (e.g., Los Angeles, Calif.), second network device 340 may be located at a second geographic location (e.g., Madrid, Spain), and third network device 360 may be located at a third geographic location (e.g., Melbourne, Australia), and client devices at any of the three geographic locations can modify the stored software packages and the modifications will be propagated (e.g., mirrored) at the software repositories at the other geographic locations without any specific network device having priority over others. Management of the federated software repository may be limited to a circle of trust established by sharing of a credential (e.g., a group key, one or more tokens, or the like) with devices that successfully join the federated software repository (e.g., based on a verification or validation process) or by using one or more token-based handshake processes. Additionally, by providing lightweight metadata updates responsive to any software modifications, and waiting to provide file (e.g., binary) updates until later repository update operations, members of the federated software repository are able to be updated in real time or near-real time to changes to the artifacts using less network traffic than if the file updates are sent responsive to the changes to the artifacts (which may take too long to support real time updates due to network and/or processing resource conditions). For example, network devices 310, 340, and 360 may communicate metadata updates 370, 374, and 378, respectively, as the corresponding software modifications occur, and may communicate file updates 372 and 376 as background operations during times when operation of network devices 310, 340, and 360 is less likely to be affected or when congestion is lower on network 362. Thus, the queueing mechanisms described herein provide the infrastructure for the federated software repository to support artifact persistency, error handling, independent updates of changes (e.g., the members do not impact other members, such that if one member is down, other members continue to receive and send metadata and file updates and once the member is back up, the member is updated independently through a full synchronization), efficient message management through use of dynamic deduplication, event cancellation, event skipping, and event aggregation), message aggregation, disaster recover (e.g., cross-site support with multiple nodes at each site), high availability (e.g., single site support for multiple nodes), and data loss identification. Additionally, sharing metadata synchronously via the metadata updates 370. 374, and 378 and then replicating the files in parallel enables the federated repository of the system 300 to meet requirements of some systems that artifact replications to be performed in order, with similar performance to if the system 300 implemented full parallelism.

According to one aspect, a system for managing a federated software repository across multiple devices is described. The system includes at least one memory (e.g., memory 320) storing instructions and one or more processors (e.g., one or more processors 312) coupled to the at least one memory. The one or more processors are configured to execute the instructions to cause the one or more processors to store at least one file (e.g., files 326) and metadata (e.g., metadata 328) corresponding to the at least one file at a first member (e.g., first network device 310 storing software repository 324) of a multi-device software repository (e.g., network devices 310, 340, and 360). The one or more processors are configured to execute the instructions to cause the one or more processors to add an entry to an event log queue (e.g., event log queue 330) at the first member. The entry indicates addition of the at least one file. The one or more processors are also configured to execute the instructions to cause the one or more processors to send, based on the entry in the event log queue, the metadata corresponding to the at least one file to other members (e.g., second network device 340 and/or third network device 360) of the multi-device software repository for storage at the other devices. The one or more processors are further configured to execute the instructions to cause the one or more processors to perform, at a later time from sending the metadata, one or more repository update operations that include sending the at least one file to at least a second member of the multi-device software repository.

According to another aspect, a computer program product is described that includes a computer-readable storage device, such as a non-transitory computer-readable storage medium, that includes instructions that, when executed by one or more processors (e.g., one or more processors 312), cause the one or more processors to perform operations for managing a federated software repository across multiple devices. The operations include storing at least one file (e.g., files 326) and metadata (e.g., metadata 328) corresponding to the at least one file at a first member (e.g., first network device 310 storing software repository 324) of a multi-device software repository (e.g., network devices 310, 340, and 360). The operations include adding an entry to an event log queue (e.g., event log queue 330) at the first member. The entry indicates addition of the at least one file. The operations also include sending, based on the entry in the event log queue, the metadata corresponding to the at least one file to other members (e.g., second network device 340 and/or third network device 360) of the multi-device software repository for storage at the other members. The operations further include performing, at a later time from sending the metadata, one or more repository update operations that include sending the at least one file to at least a second member of the multi-device software repository.

FIGS. 4A-E illustrate block diagrams of an example of a system 400 for managing a federated software repository across at least two devices according to one or more aspects. System 400 includes a first member 410 and a second member 460 (e.g., two repository servers or other network devices configured to support storage of software repositories), and members 410 and 460 are linked (e.g., via one or more networks 442) to create a federated software repository at two distinct geographic locations. In some implementations, system 400 may include or correspond to system 300 of FIG. 3 (or components thereof). For example, first member 410 may include or correspond to first network device 310 and software repository 324, and second member 460 may include or correspond to second network device 340 and software repository 352. Although two members are shown, and 2-way mirroring is described, with reference to FIGS. 4A-E, in other implementations, the techniques described may be applied to federated software repositories that include more than two members and/or that use more than 2-way mirroring.

Figure 4A:
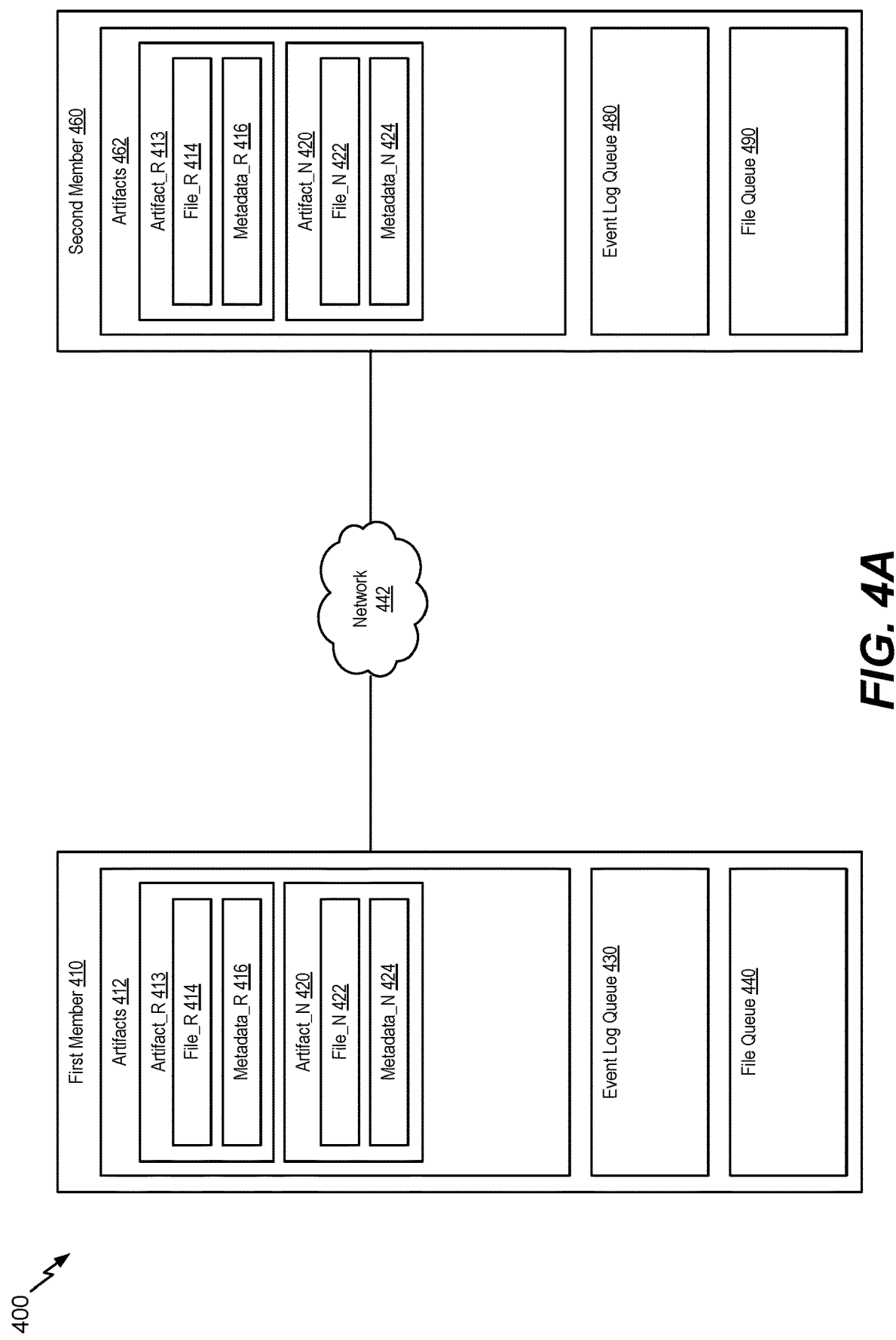
FIGS. 4A-E are block diagrams of an example of a system for managing a federated software repository across at least two devices.

Referring to FIG. 4A, first member 410 and second member 460 are shown at an initial time, such as after a recent designated sync time period or after the federated repository is formed and an initial synchronization is performed. As such, first member 410 and second member 460 store the same artifacts (e.g., the same files and metadata). To illustrate, first member 410 stores artifacts 412 that include a first artifact 413 ("Artifact_R") and a second artifact 420 ("Artifact N"), and second member 460 stores artifacts 462 that include the first artifact 413 and the second artifact 420. First artifact 413 includes a first file 414 ("File_R") and first metadata 416 ("Metadata_N") and second artifact 420 includes a second file 422 ("File_N") and second metadata 424 ("Metadata_N"). Although referred to as single files, each of first file 414 and second file 422 may represent one or multiple files, and are referred to as a single file merely for convenience of description. First artifact 413 and second artifact 420 may be part of one or more software releases or software packages. In some implementations, the one or more software releases include or correspond to an executable file package or a "container", such as a Docker container, that includes the artifacts (e.g., the files/binaries and metadata), libraries, linking information, permissions, an operating system or other control executables, and the like, to enable the software releases to be secured, permission-controlled, and executable at different devices or in different computing environments. In some implementations, the federated software repository (e.g., first member 410 and second member 460) are configured to store files in accordance with a single supported container type, such as Docker, as a non-limiting example.

Metadata 416 and 424 may include metadata corresponding to artifacts 413 and 420 (e.g., files 414 and 422), respectively. Metadata 416 and 424 may include file-specific metadata (e.g., metadata for each of one or more files included in files 414 and 422 if files 414 and 422 do not include an entirety of a software release or software package), software release-specific metadata (e.g., metadata for a software release represented by artifacts 413 or 420 if artifacts 413 or 420 represent an entirety of a software release), searchable properties and other information as described with reference to FIGS. 1-3, or any combination thereof. Illustrative examples of metadata 416 and 424 include file names, recent modification dates, file sizes, file permissions, build creation dates, build job names, identifiers of who initiated the builds, times the builds were initiated, build agents, CI servers, build job numbers, quality assurance test passed indicators, checksums for files, release names, release sizes, checksums of entireties of releases, release permissions, and/or one or more other properties that annotate the files or the software releases. Such metadata may be generated when a corresponding file is created or modified. For example, first metadata 416 may be generated or modified when first file 414 is created or modified, and second metadata 424 may be generated or modified when second file 422 is created or modified.

Members 410 and 460 may also store respective event log queues configured to store entries that indicate events performed to artifacts stored at the members and respective file queues configured to store entries that indicate operations to be performed as repository update operations. To illustrate, first member 410 may include event log queue 430 and file queue 440, and second member 460 may include event log queue 480 and file queue 490. In some implementations, event log queues 430 and 480 and file queues 440 and 490 are configured to support error handling, deduplication, and other management operations, as described above with reference to FIGS. 1-3. Because FIG. 4A illustrates an initial time in which first member 410 and second member 460 are synchronized, event log queues 430 and 480 and file queues 440 and 490 are shown as empty in FIG. 4A.

Figure 4B:
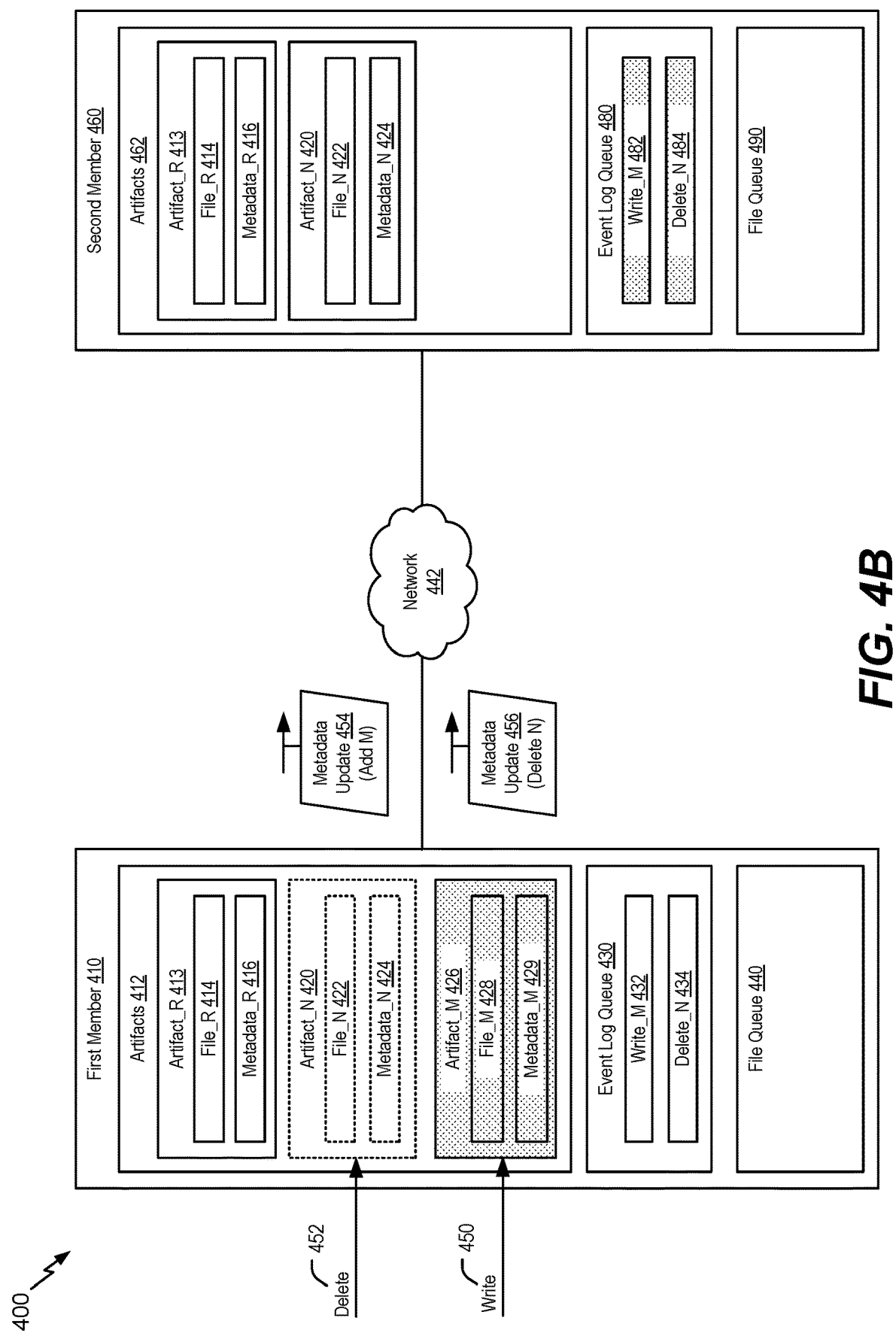

FIG. 4B illustrates system 400 during modification of one or more of artifacts 412 at first member 410. For example, a client device may initiate performance of a write operation 450 to cause a third artifact 426 ("Artifact_M") to be stored at first member 410 as part of artifacts 412, as indicated by the fill pattern of third artifact 426 in FIG. 4B. Third artifact 426 includes a third file 428 ("File M") and third metadata 429 ("Metadata_M") that corresponds to third artifact 426/third file 428. Additionally, a client device (e.g., the same client device or a different client device) may initiate performance of a delete operation 452 to delete second artifact 420 from artifacts 412 stored at first member 410, as indicated by the dotted outline of second artifact 420 in FIG. 4B.

In response to operations 450 and 452, first member 410 may add corresponding entries to event log queue 430. For example, first member 410 may add a first entry 432 ("Write_M") to indicate addition of third artifact 426 and a second entry 434 ("Delete_N") to indicate deletion of second artifact 420. Responsive to entries in event log queue 430, first member 410 may send metadata updates to second member 460. For example, first member 410 may send metadata update 454 ("Add M") and metadata update 456 ("Delete_N") to second member 460. Metadata update 454 may include third metadata 429, and metadata update 456 may include second metadata 424 and/or an instruction or indication to delete second metadata 424. Because file sizes of metadata updates 454 and 456 may be significantly smaller than the files sizes of third file 428 and second file 422, respectively, sending metadata updates 454 and 456 may be faster and cause less network traffic then sending the entirety of third file 428 and second file 422. Thus, sending metadata updates 454 and 456 may enable real time or near-real time updates of artifact changes at second member 460.

In response to the received metadata updates, second member 460 may add corresponding entries to event log queue 480. For example, second member 460 may add first entry 482 ("Write_M") responsive to receipt of metadata update 454, and second member 460 may add second entry 484 ("Delete_N") responsive to receipt of metadata update 456. Entries 482 and 484 may indicate operations to be performed to synchronize metadata of artifacts 462 at second member 460 with metadata of artifacts 412 at first member 410. In an alternate implementation, members may only add entries to respective event log queues for changes made to artifacts at the member, not based on metadata updates received from other members, such that the event log queues represent events for which metadata is to be sent to other members of the federated software repository. In some implementations, if multiple metadata updates are received from multiple devices within a same time period or from client devices of second member 460, second member 460 may perform conflict resolution to determine which metadata updates to persist and use as the basis for entries in event log queue 480. The conflict resolution process may involve comparing timestamps of metadata updates received from other members to each other and/or to timestamps of operations performed by client devices of second member 460 to determine which operations to perform and metadata to persist, in addition to which entries to add to event log queue 480, as further described herein with reference to FIG. 8. Additionally or alternatively, second member 460 may retry adding entries to event log queue 480 if an error is detected with adding any of the entries, as further described above with reference to FIG. 3. In some other implementations, conflict resolution is not performed as metadata updates may be fast enough to eliminate most or all conflicts, and any conflicts can be addressed by performing a full synchronization operation.

Figure 4C:
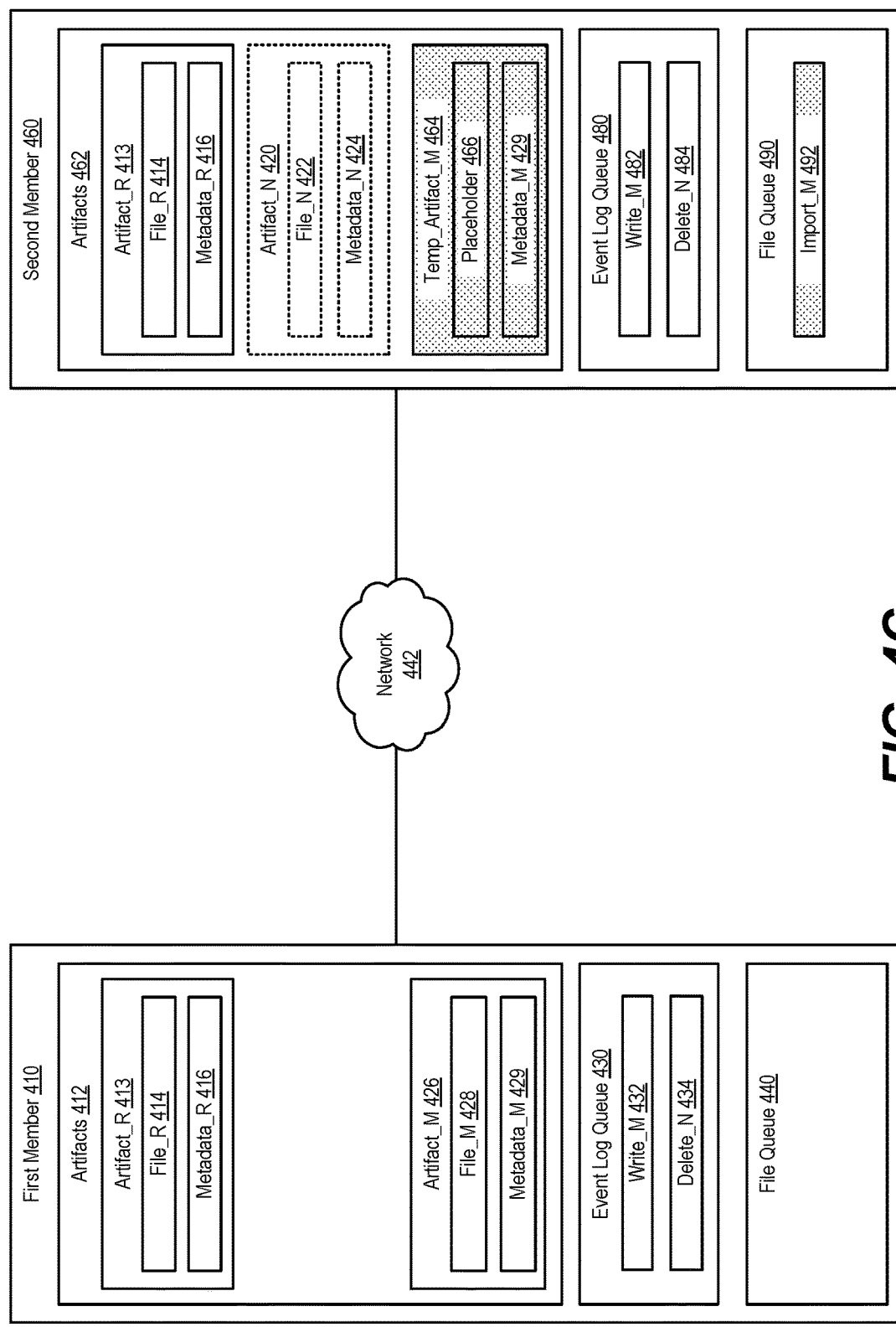

FIG. 4C illustrates system 400 after performance of operations 450 and 452 at first member 410 and receipt of metadata updates 454 and 456 at second member 460. To illustrate, after performance of operations 450 and 452, artifacts 412 at first member 410 include first artifact 413 and third artifact 426. Second artifact 420, including second file 422 and second metadata 424, has been deleted.

Second member 460 may perform one or more operations based on receipt of metadata updates 454 and 456. To illustrate, second member 460 adds third metadata 429 as part of temporary artifact 464 ("Temp_Artifact_M") to artifacts 462 based on metadata update 454 including third metadata 429, and optionally an indication or instruction to add third metadata 429 as new metadata that corresponds to new file(s)/artifact(s). In some implementations, second member 460 may compare one or more checksums included in metadata update 454 to checksums stored as metadata of artifacts 462 to determine whether second member 460 already has third file 428, and third metadata 429 may be added based on a determination that the one or more checksums included in metadata update 454 do not match metadata stored at second member 460. Entries may be added to event log queue 480 based on the same checksum comparisons described above. As another example, second member 460 deletes second artifact 420, including second file 422 and second metadata 424, from artifacts 462 based on metadata update 456 including an instruction to delete, or indicator of, second metadata 424.

In some implementations, members may add temporary or placeholder files based on metadata updates that include new metadata, in order to enable modifications to artifacts that may involve the new files, prior to receipt of the new files. For example, second member 460 may generate and store a placeholder file 466 as part of temporary artifact 464 based on metadata update 454. Placeholder file 466 may have one or more properties indicated by third metadata 429. As used herein, a placeholder file, also referred to as a "blob" or a "hollow blob", may refer to a large storage object for unstructured data, in the case of a hollow blob, unstructured data that has yet to be received. As an example, a placeholder file may include or correspond to a large storage object for binaries (e.g., files). In some implementations, the placeholder file may be a proprietary file type, a publicly-available file type, or a third party created file type, such as a blob storage supported by Microsoft® Azure, as a non-limiting example (Microsoft is a registered trademark of Microsoft Corporation of Redmond, Wash.).

Additionally, in response to metadata updates 454 and 456, second member 460 may add entries to file queue 490. For example, second member 460 may add first entry 492 ("Import M") to file queue 490 responsive to metadata update 454. The entries may indicate operations to be performed by second member 460 to import new or modified files from first member 410. For example, first entry 492 may indicate to import (e.g., pull) third file 428 from first member 410 as part of repository update operations. Because deletion of artifacts may occur responsive to receiving metadata updates, no entry is shown in FIG. 4C that corresponds to metadata update 456. In some other implementations, if files are not deleted immediately, second member 460 may add a second entry to file queue 490 that indicates to delete second file 422. Although file exchanges are described in accordance with a pull scheme with reference to FIGS. 4A-E, in other implementations, a push scheme may be supported.

Figure 4D:
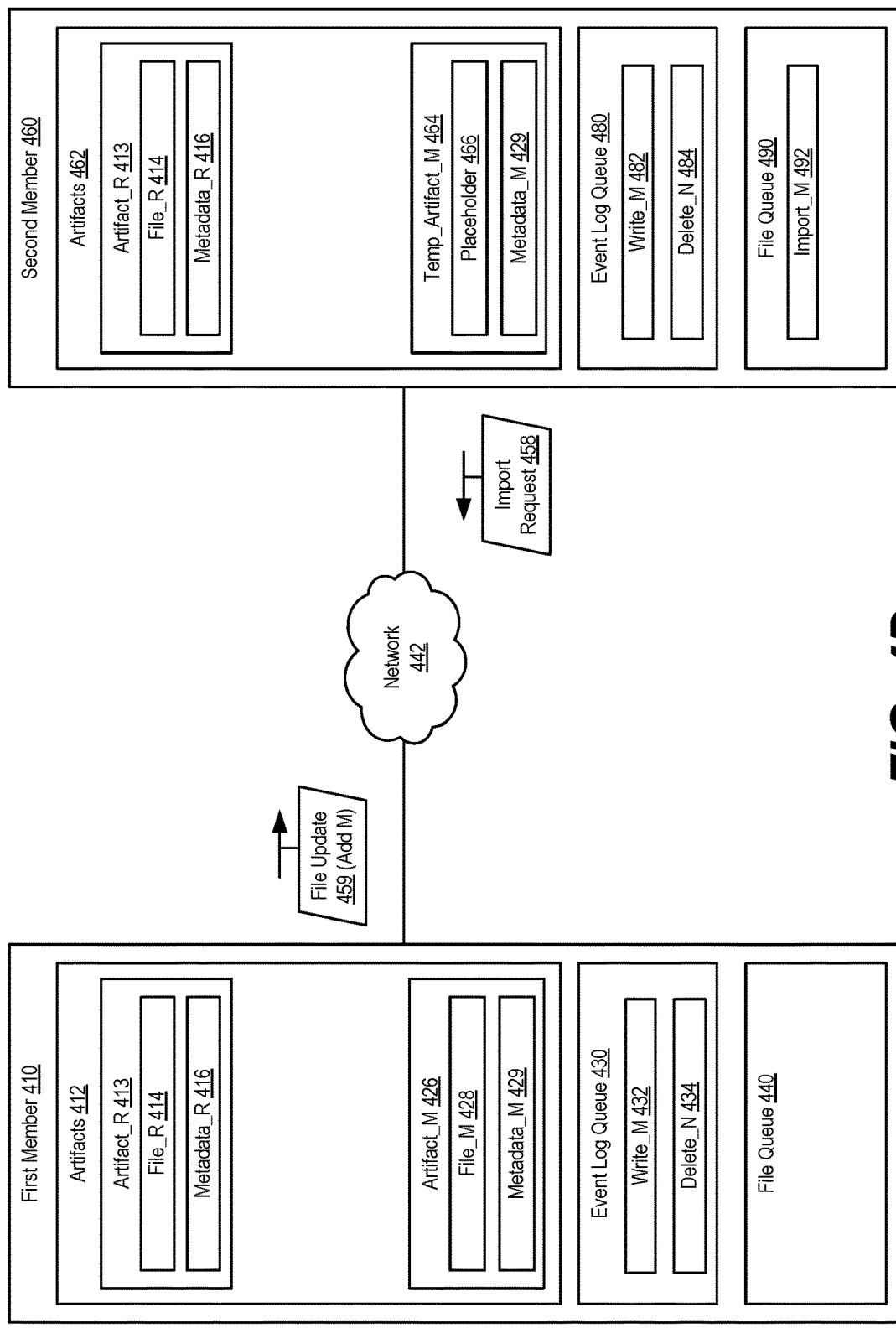

FIG. 4D illustrates system 400 during performance of repository update operations by second member 460. In some implementations, first member 410 may perform repository update operations at the same time as second member 460. In some other implementations, members 410 and 460 may perform repository update operations at different times. To perform repository update operations, second member 460 may retrieve entries from file queue 490 and perform the operations indicated by the entries to obtain any new or modified files from first member 410. For example, second member 460 may retrieve first entry 492 from file queue 490 and, based on first entry 492, second member 460 may send import request 458 to first member 410. Import request 458 may include a request for third file 428 (e.g., one or more new files) that were stored at first member 410 as shown in FIG. 4B. Sending import request 458 may be part of a pull command or pull operation to retrieve one or more files not stored at second member 460. Responsive to receiving import request 458, first member 410 may provide the requested files (e.g., binaries) to second member 460. For example, first member 410 may send third file 428 to second member 460 as file update 459.

In some implementations, prior to retrieving entries from file queue 490, second member 460 may perform a deduplication process and/or a conflict resolution process on entries in file queue 490, such as prior to initiating repository update operations, as entries are added to file queue 490, or at another time. The deduplication process may involve removing or merging entries that correspond to duplicate or otherwise unnecessary operations, such as merging an entry to import a new file with a subsequent entry to import a modified version of the same file into a single entry to import the modified file or removing an entry to import a new file and a subsequent entry to delete the same file, as further described herein with reference to FIG. 9.

After retrieving and processing entries from file queue 490, the entries may be deleted. For example, after retrieving first entry 492 and sending import request 458 to first member 410, second member 460 may delete (e.g., remove) first entry 492 from file queue 490. In some implementations, entries may be retrieved, processed, and removed from file queue 490 one at a time (e.g., serially) in storage order. In some other implementations, multiple entries may be retrieved and processes, and multiple file exchange operations may be performed in parallel, based on available network resources, available processing resources, file sizes, and the like.

Figure 4E:
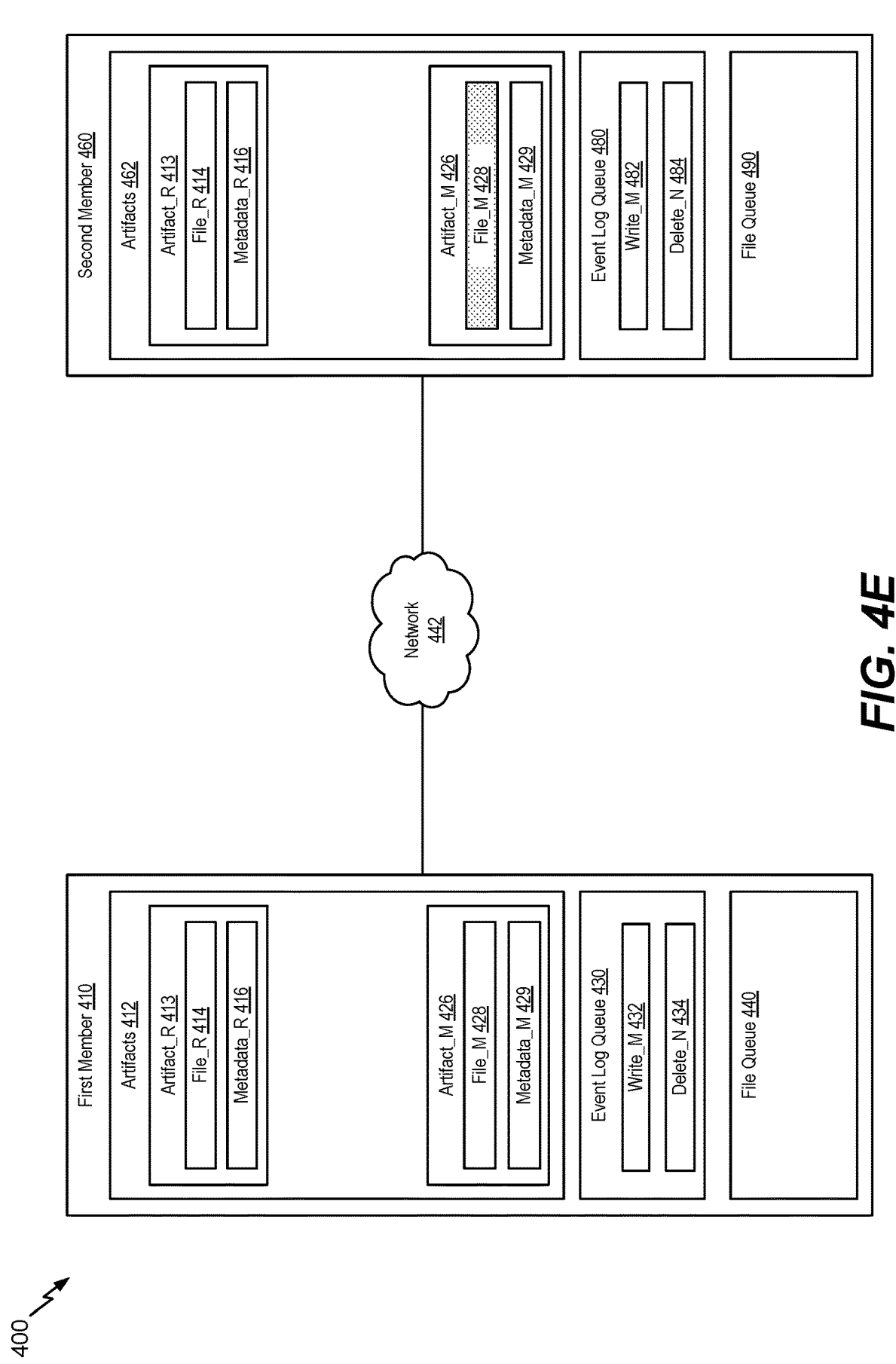

FIG. 4E illustrates system 400 after receipt of file update 459 by second member 460. During the time shown in FIG. 4E, second member 460 processes the received file update and, in combination with entries in event log queue 430, performs operations to synchronize artifacts 462 to artifacts 412 stored at first member 410. To illustrate, based on first entry 482 in event log queue 480 and file update 459, second member 460 may store third file 428 included in file update 459 at second member 460 as part of third artifact 426. In some implementations, storing third file 428 may include overwriting placeholder file 466 with third file 428 and applying any settings, permissions, or properties indicated by third metadata 429 to third file 428. In some implementations, after retrieving and processing entries from event log queue 480, the entries may be deleted (e.g., removed). For example, after retrieving first entry 482 and storing third file 428 as part of third artifact 426, second member 460 may delete first entry 482 from event log queue 480.

FIGS. 5A-D illustrate block diagrams of another example of a system 500 for managing a federated software repository across at least two devices according to one or more aspects. System 500 includes a first member 510 and a second member 560 (e.g., two repository servers or other network devices configured to support storage of software repositories), and members 510 and 560 are linked (e.g., via one or more networks 542) to create a federated software repository at two distinct geographic locations. In some implementations, system 500 may include or correspond to system 300 of FIG. 3 or system 400 of FIGS. 4A-E (or components thereof). For example, first member 510 may include or correspond to first network device 310 and software repository 324 of FIG. 3 or first member 410 of FIGS. 4A-E, and second member 560 may include or correspond to second network device 340 and software repository 352 of FIG. 3 or second member 460 of FIGS. 4A-E. Although two members are shown, and 2-way mirroring is described, with reference to FIGS. 5A-D, in other implementations, the techniques described may be applied to federated software repositories that include more than two members and/or that use more than 2-way mirroring. Compared to FIGS. 4A-E, which illustrate performance of repository update operations based on entries in file queues, such as via performance of background operations during times of less network congestion, increased availability of processing resources, etc., FIGS. 5A-D illustrate file exchange based on a sync command.

Figure 5A:
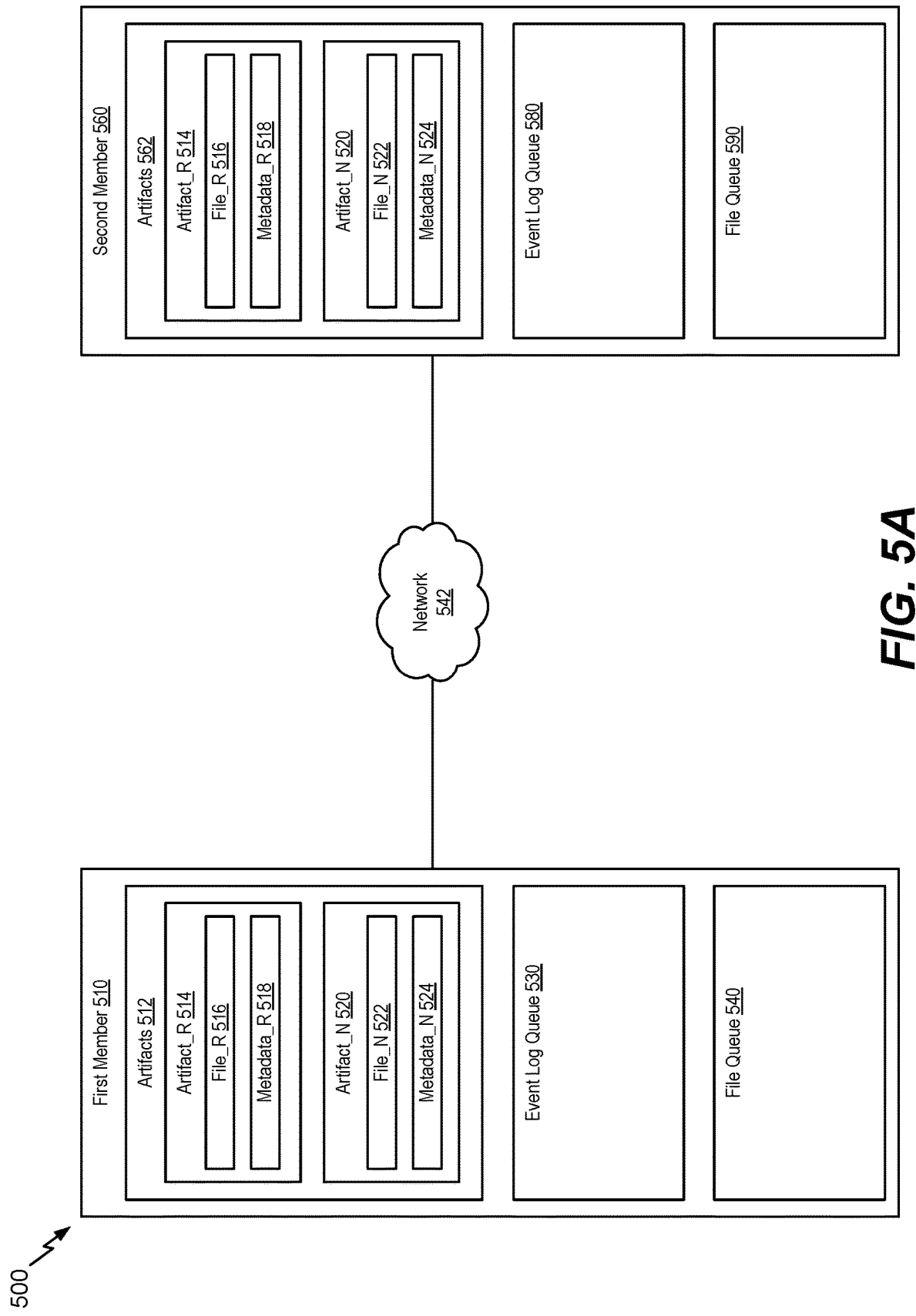
FIGS. 5A-D are block diagrams of another example of a system for managing a federated software repository across at least two devices.

Referring to FIG. 5A, first member 510 and second member 560 are shown at an initial time, when both members are synchronized. As such, first member 510 and second member 560 store the artifacts (e.g., the same files and metadata). To illustrate, first member 510 stores artifacts 512 that include first artifact 514 ("Artifact_R") and second artifact 520 ("Artifact N"), and second member 560 stores artifacts 562 that include first artifact 514 and second artifact 520. First artifact 514 includes a first file 516 ("File_R", which may include one or more files) and first metadata 518 that corresponds to first file 516 and/or first artifact 514, and second artifact 520 includes a second file 522 ("File_N", which may include one or more files) and second metadata 524 ("Metadata_N") that corresponds to second file 522/ second artifact 520. Members 510 and 560 may also store respective event log queues and file queues. To illustrate, first member 510 may include event log queue 530 and file queue 540, and second member 560 may include event log queue 580 and file queue 590.

Figure 5B:
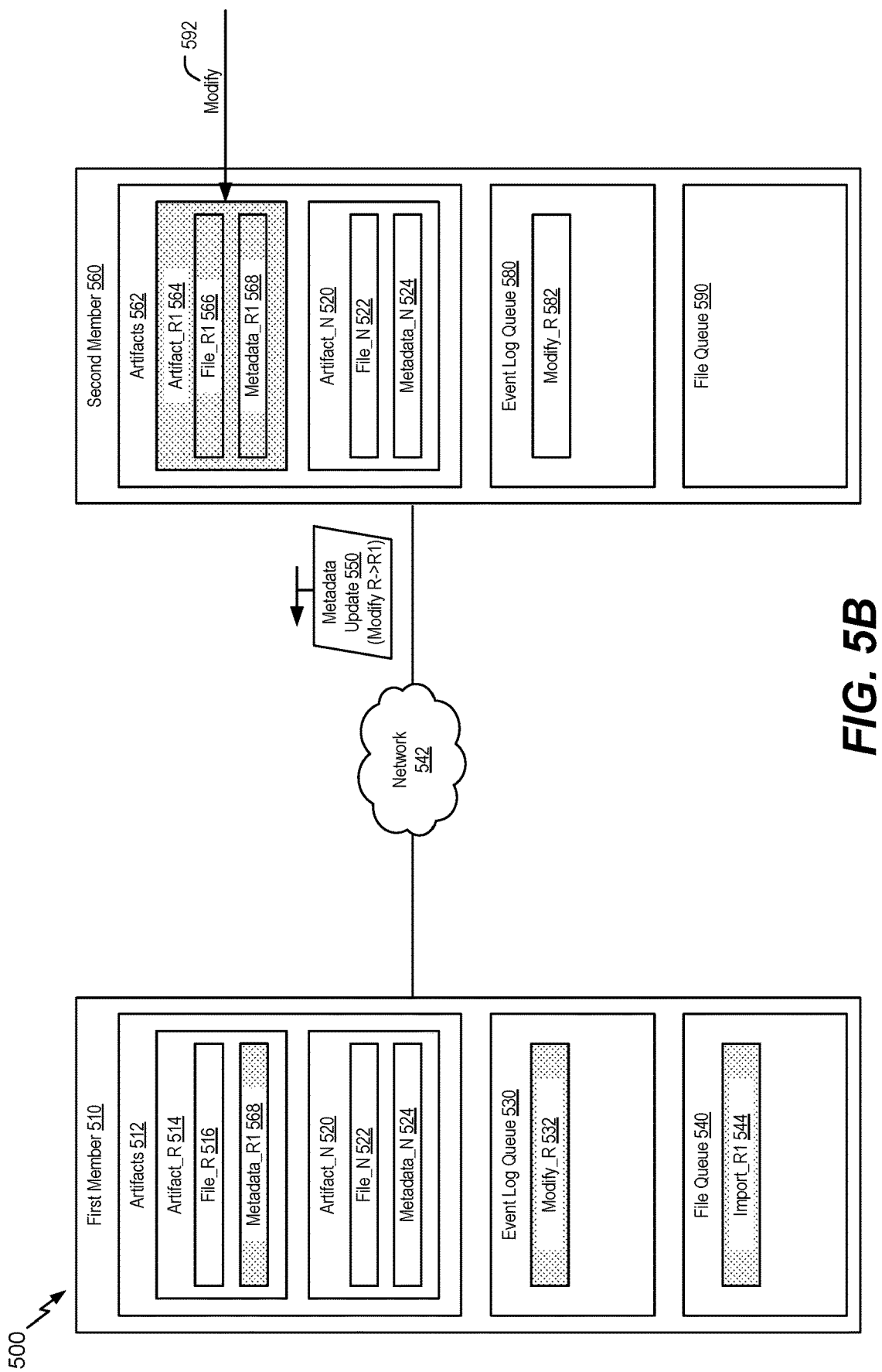

FIG. 5B illustrates during modification of one or more of artifacts 562 at second member 560. For example, a client device may initiate performance of a modification operation 592 to cause modification of first artifact 514 stored at second member 560 to create modified artifact 564 ("Artifact_R1"), such as by adding, deleting, or editing code associated with first file 516. Modified artifact 564 includes modified file 566 ("File_R1") and modified metadata 568 ("Metadata_R1"). As non-limiting examples, a last saved date, an author (or modifier), a file size, or the like, indicated by first metadata 518 may be modified based on modified file 566 to create modified metadata 568.

In response to modification operation 592, second member 560 may add a first entry 582 ("Modify_R") to event log queue 580. First entry 582 indicates modification of first artifact 514 and/or existence of modified artifact 564. Based on first entry 582, second member 560 may send a metadata update to first member 510. For example, second member 560 may send metadata update 550 to first member 510. Metadata update 550 may include modified metadata 568 and, optionally, an instruction to modify first metadata 518. Responsive to receiving metadata update 550, first member 510 may add first entry 532 ("Modify_R") to event log queue 530 and may use metadata update 550 to update first metadata 518. For example, first member 510 may overwrite first metadata 518 with modified metadata 568 included in metadata update 550. In some implementations, a conflict resolution process and/or a deduplication process may be performed responsive to receipt of metadata update 550 and prior to performance of operations and addition of entries to event log queue 530, as described above with reference to FIGS. 1-3. Additionally, based on first entry 532, first member 510 may add first entry 544 ("Import_R1") to file queue 540. First entry 544 may indicate to import modified file 566 from second member 560 as part of repository update operations, such as during a time of low network congestion.

Figure 5C:
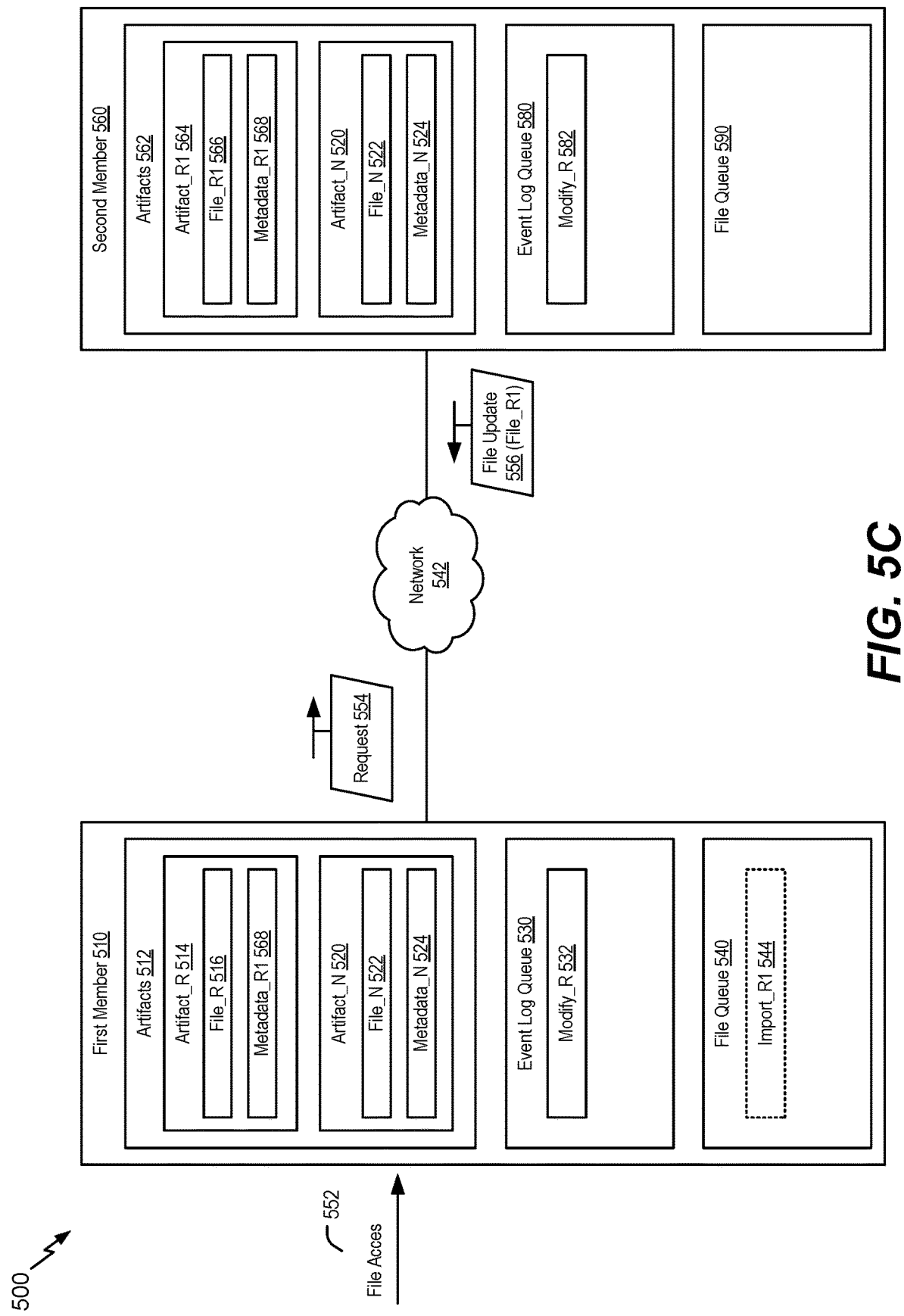

FIG. 5C illustrates system 500 at a time that is prior to performance of repository update operations. At this point, first member 510 may receive file access 552 (e.g., from a user or another application or process). For example, a user may attempt to access first file 516 before the repository update operations (e.g., before modified file 566 is shared). Although described as a file access, similar operations for all artifacts may be performed based on a sync request (e.g., to synchronize first member 510 with the federated repository). Based on file access 552, first member 510 may initiate an asynchronous (e.g., on-demand) update process to synchronize first artifact 514 at first member 510 with modified artifact 564 at second member 560. For example, first member 510 may send request 554 to second member 560.

In response to receiving request 554 from first member 510, second member 560 may provide the requested files. For example, second member 560 may send file update 556 to first member 510. File update 556 may include modified file 566 (e.g., one or more modified files) that are stored at second member 560 as shown in FIG. 5B, and optionally an instruction to use modified file 566 to modify first file 516. First member 510 may delete a corresponding entry in file queue 540 based on receipt of file access 552 and/or receipt of file update 556. For example, after receiving file access 552 and receiving file update 556, first member 510 may delete (e.g., remove) first entry 544 from file queue 540.

Figure 5D:
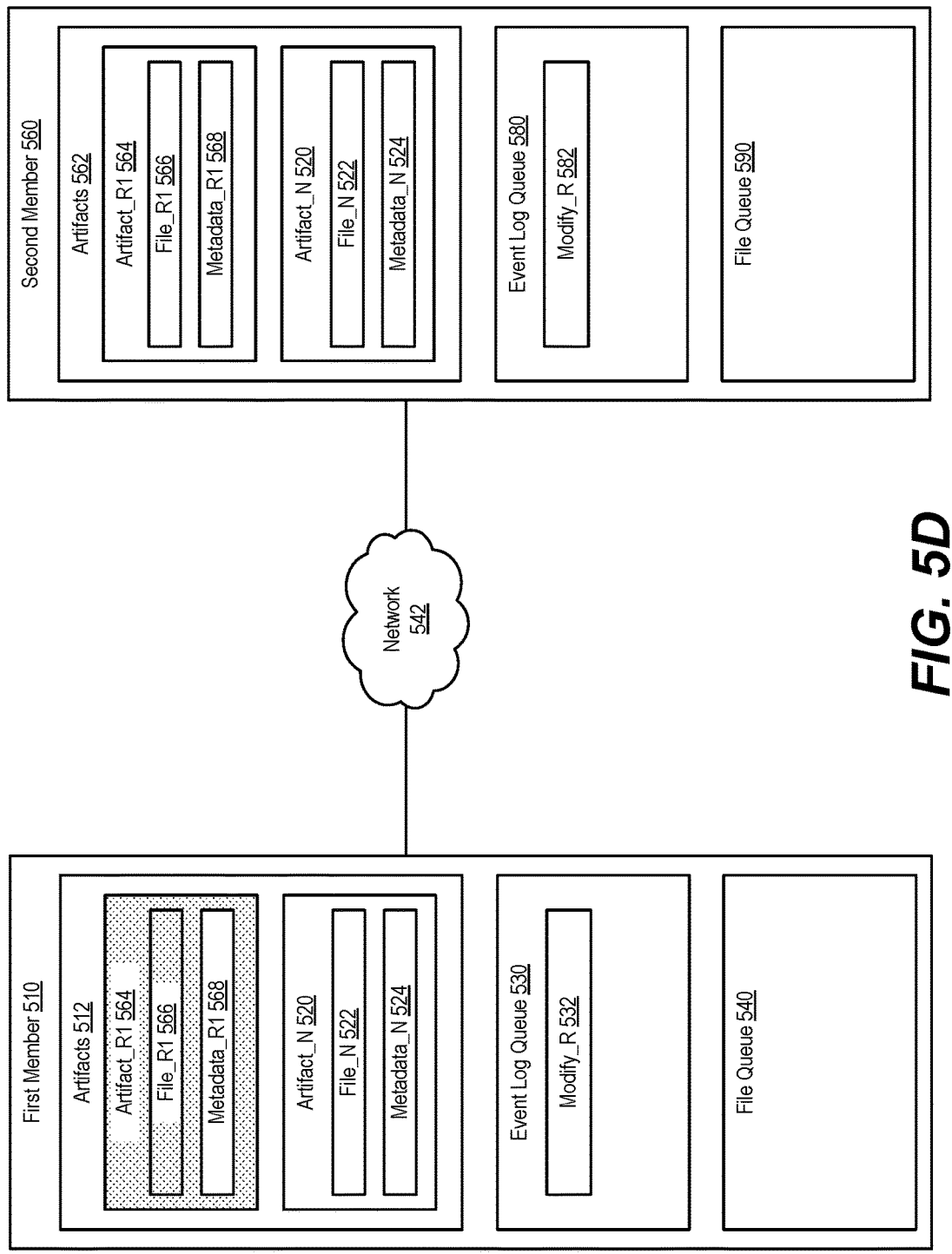

FIG. 5D illustrates system 500 after receipt of file update 556 by first member 510. During the time shown in FIG. 5D, first member 510 processes the received file update and, in combination with entries in event log queue 530, performs operations to create modified artifact 564. To illustrate, based on first entry 532 and file update 556, first member 510 may store modified file 566 included in file update 556 as part of modified artifact 564 at artifacts 512, such as by overwriting or otherwise modifying first file 516. To avoid redundant importing of modified file 566, first entry 544 is removed so that, during repository update operations, first member 510 does not retrieve an entry from file queue 540 that causes first member 510 to import modified file 566 again.

Figure 6:
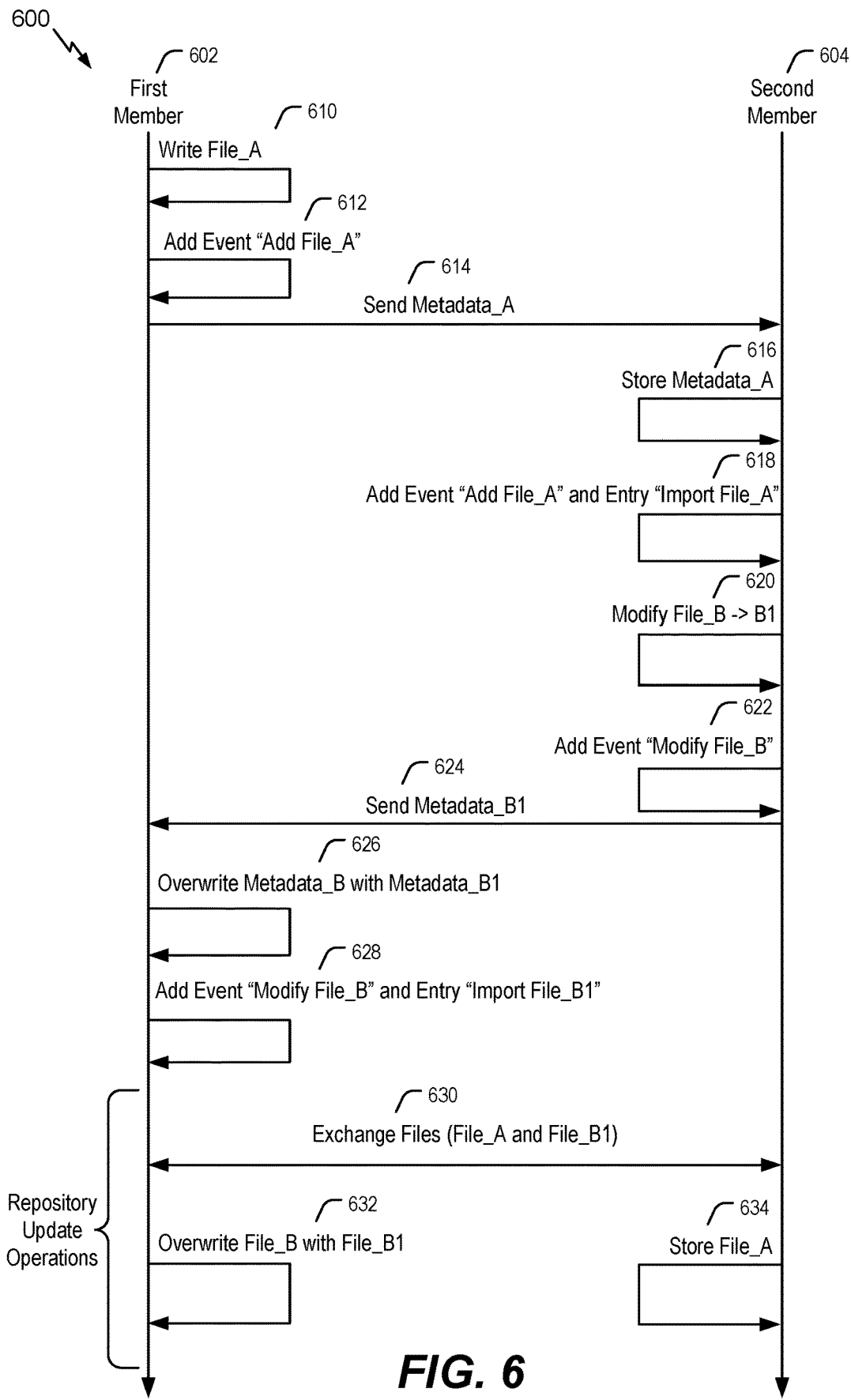
FIG. 6 is a diagram illustrating examples of operations for managing a federated software repository.

Referring to FIG. 6, a ladder diagram of operations for managing a federated software repository (e.g., a multi-device software repository) according to one or more aspects is shown as operation 600. Operations 600 may be performed by a first member 602 and a second member 604, which may be linked (e.g., via one or more networks) and configured to support a federated software repository between first member 602 and second member 604. In some implementations, first member 602 may include or correspond to first network device 310 and software repository 324 of FIG. 3, first member 410 of FIGS. 4A-E, or first member 510 of FIGS. 5A-D, and second member 604 may include or correspond to second network device 340 and software repository 352 of FIG. 3, second member 460 of FIGS. 4A-E, or second member 560 of FIGS. 5A-D.

Operations 600 may include first member 602 writing File_A, at 610. For example, a client of first member 602 may provide a write command to initiate storage of one or more new files (e.g., File_A) at first member 602. Writing (e.g., storing) File_A at first member 602 may include generating and storing Metadata_A at first member 602, the Metadata_A based on and corresponding to File_A. Based on writing File_A, first member 602 may add a first event entry Add File_A to an event log queue at first member 602, at 612. Based on the first event entry, first member 602 may send Metadata_A to second member 604, at 614. For example, first member 602 may send a metadata update that includes Metadata_A, and optionally an instruction to add new metadata, to second member 604.

Based on receiving Metadata_A, second member 604 may store Metadata_A, at 616. For example, second member 604 may add a new artifact that includes Metadata_A. In some implementations, second member 604 may also generate and store a placeholder file representing File_A (e.g., based on Metadata_A) at second member 604, as described above. In some implementations, addition of the new artifact is conditioned upon checksum(s) in the received metadata update not matching checksums of any artifacts stored at second member 604. Second member 604 may also add a first event entry Add File_A to an event log queue and a first entry Import File_A to a file queue at second member 604, at 618.

Second member 604 may modify File_B to create File_B1, at 620. For example, a client of second member 604 may provide one or more edit commands to cause modification of one or more existing files (e.g., File_B) that results in storage of one or more modified files (e.g., File_B1) at second member 604. Modifying File_B may also include modifying Metadata_B to create Metadata_B1. For example, existing metadata (e.g., Metadata_B) that corresponds to one or more existing files (e.g., File_B) may be modified, resulting in storage of modified metadata (e.g., Metadata_B1) that tracks the modifications to the one or more existing files. Based on modifying File_B, second member 604 may add a second event entry Modify File_B to its event log queue, at 622. Based on the second event entry, second member 604 may send Metadata_B1 to first member 602, at 624. For example, second member 604 may send a metadata update that includes Metadata_B1, and optionally an instruction to modify Metadata_B based on Metadata_B1, to first member 602.

Based on receiving Metadata_B1, first member 602 may overwrite Metadata_B with Metadata_B1, at 626. By overwriting Metadata_B with the modified Metadata_B1, additional operations that update metadata at first member 602 will be properly performed based on the most recent metadata. First member 602 may also add a second event entry Modify File_B to its event log queue and a second entry Import File_B1 to its file queue, at 628. Additional operations may be performed, metadata updates sent, and entries added to event log queues and update queues, as described above. In some implementations, operations that modify files that are to be added, modified, or deleted (as indicated by metadata updates) may be rejected until performance of repository update operations. Additionally or alternatively, modifications to permissions, settings, or other properties of files, may be performed by modifying the corresponding metadata even if the new or modified files have not yet been received. Thus, because metadata updates are exchanged as operations are performed, partial synchronization of the members 602 and 604 may occur in real-time or near real-time due to the speed of sending small metadata files, as compared to waiting for transmission of the files themselves, which may take significantly larger due to the files having significantly larger sizes.

Repository update operations may occur, at 630-634. The repository update operations may be performed asynchronously (e.g., based on one or more trigger conditions) or during a designated update time period, as described above. During the repository update operations, first member 602 and second member 604 may retrieve entries from their file queues and perform operations to exchange files (e.g., binaries). To illustrate, first member 602 and second member 604 may exchange files, at 630. Exchanging files may include second member 604 retrieving the first entry Import File_A from its file queue and sending an import request that indicates File_A to first member 602, and first member 602 sending File_A as a file update to second member 604 responsive to receiving the import request. Exchanging files may also include first member 602 retrieving the first entry Import File_B1 from its file queue and sending an import request that indicates File_B1 to second member 604, and second member 604 sending modified File_B1 as a file update to first member 602 responsive to receiving the import request. First member 602 may overwrite File_B with File_B1, at 632. For example, first member 602 may retrieve the second event entry Modify File_B from its event log queue and overwrite File_B with File_B1 included in the file update received from second member 604. Second member 604 may store File_A, at 634. For example, second member 604 may retrieve the first event entry Add File_A from its event log queue and store File_A included in the file update received from first member 602 at second member 604. In some implementations, storing File_A may include overwriting the placeholder file with File_A. Although illustrated in FIG. 6 as files being exchanged at the same time, at 630, such illustration is for convenience, and the operations at 630-634 are intended to be performed either serially or in parallel.

After performing the operations indicated by the retrieved entries, first member 602 and second member 604 may delete the corresponding entries from the respective file queues. For example, after receiving File_A, second member 604 may delete the first entry Import File_A from its file queue, and after receiving File_B1, first member 602 may delete the first entry Import File_B1 from its file queue. Additional entries may be similarly retrieved, and corresponding operations similarly performed, until the file queues are empty.

In this manner, first member 602 and second member 604 may share metadata immediately (e.g., in real time or near-real time) but wait until a later time to exchange files (e.g., binaries), which may occur at times of lesser network congestion or latency, lesser expected use of processing resources by the members, or based on other trigger conditions, without requiring files to be frozen at other members until they can be fully communicated. Modifications to settings, permissions, or other properties that are tracked using the previously provided metadata updates can be made upon receipt of the files, thereby enabling the members to continue operating as a federated software repository while waiting to receive new or updated files from other members.

Figure 7:
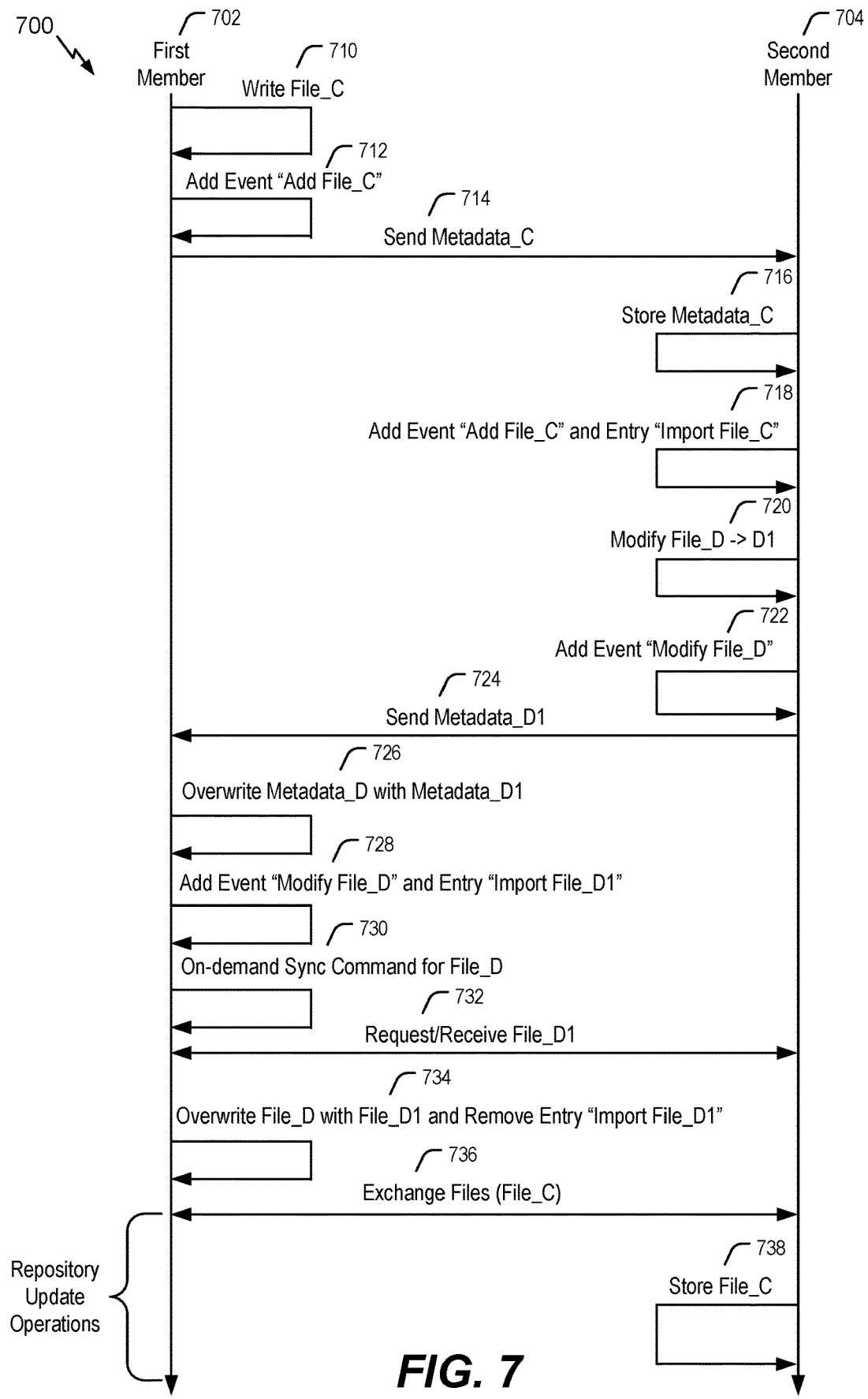
FIG. 7 is a diagram illustrating additional examples of operations for managing a federated software repository.

Referring to FIG. 7, a ladder diagram of operations for managing a federated software repository (e.g., a multi-device software repository) according to one or more aspects is shown as operations 700. Operations 700 may be performed by a first member 702 and a second member 704, which may be linked (e.g., via one or more networks) and configured to support a federated software repository between first member 702 and second member 704. In some implementations, first member 702 may include or correspond to first network device 310 and software repository 324 of FIG. 3, first member 410 of FIGS. 4A-E, first member 510 of FIGS. 5A-D, or first member 602 of FIG. 6, and second member 704 may include or correspond to second network device 340 and software repository 352 of FIG. 3, second member 460 of FIGS. 4A-E, second member 560 of FIGS. 5A-D, or second member 604 of FIG. 6.

Operations 700 may include first member 702 writing File_C, at 710. Writing (e.g., storing) File_C at first member 702 may include generating and storing Metadata_C at first member 702, the Metadata_C based on and corresponding to File_C. Based on writing File_C, first member 702 may add a first event entry Add File_C to an event log queue at first member 702, at 712. Based on the first event entry, first member 702 may send Metadata_C to second member 704, at 714. For example, first member 702 may send a metadata update that includes Metadata_C, and optionally an instruction to add new metadata, to second member 704. Based on receiving Metadata_C, second member 704 may store Metadata_C, at 716. In some implementations, second member 704 may also generate and store a placeholder file representing File_C (e.g., based on Metadata_C) at second member 704, as described above. Second member 704 may also add a first event entry Add File_C to an event log queue at second member 704, and second member 704 may add a first entry Import File_C to a file queue at second member 704, at 718.

Second member 704 may modify File_D to create File_D1, at 720. Modifying File_D may also include modifying Metadata_D to create Metadata_D1. Based on modifying File_D, second member 704 may add a second event entry Modify File_D to its event log queue, at 722. Based on the second event entry, second member 704 may send Metadata_D1 to first member 702, at 724. For example, second member 704 may send a metadata update that includes Metadata_D1, and optionally an instruction to modify Metadata_D based on Metadata_D1, to first member 702. Based on receiving Metadata_D1, first member 702 may overwrite Metadata_D with Metadata_D1, at 726. First member 702 may also add a second event entry Modify File_D to its event log queue and a first entry "Import File_D1" to its file queue, at 728. Additional operations may be performed, metadata updates sent, and entries added to event log queues and file queues, as described above.

First member 702 may receive an on-demand sync command for File_D, at 730. For example, the on-demand sync command may be received from a client, from another application or process that accesses File_D, or automatically initiated based on one or more trigger conditions. Based on the on-demand sync command, first member 702 may request the modified File_D1 from second member 704, and second member 704 may send File_D1 to first member 702, at 732. For example, second member 704 may send a file update that includes File_D1, and optionally an instruction to modify File_D based on File_D1, to first member 702. First member 702 may overwrite File_D with File_D1 and remove the first entry "Import File_D1" from its file queue, at 734. For example, first member 702 may retrieve the second event entry Modify File_D from its event log queue and may overwrite File_D with File_D1 included in the file update received from second member 704, in addition to deleting the entry "Import File_D1" from its file queue to prevent a later redundant import.

At a later time, repository update operations may be performed, at 736-738. During the repository update operations, first member 702 and second member 704 may retrieve entries from their file queues and exchange corresponding files. To illustrate, first member 702 and second member 704 may exchange files, at 736. Exchanging files may include second member 704 retrieving the first entry Import File_C from its file queue and sending an import request to first member 702, and first member 702 may send a file update that includes File_C, and optionally an instruction to store File_C as a new file, to second member 704 responsive to the import request. Second member 704 may store File_C, at 738. For example, second member 704 may retrieve the first event entry Add File_C from its event log queue and store File_C included in the file update received from first member 702 at second member 704. In some implementations, storing File_C may include overwriting the placeholder file with File_C. After receiving File_C from first member 702, second member 704 may delete the first entry Import File_C from its file queue.

Figure 8:
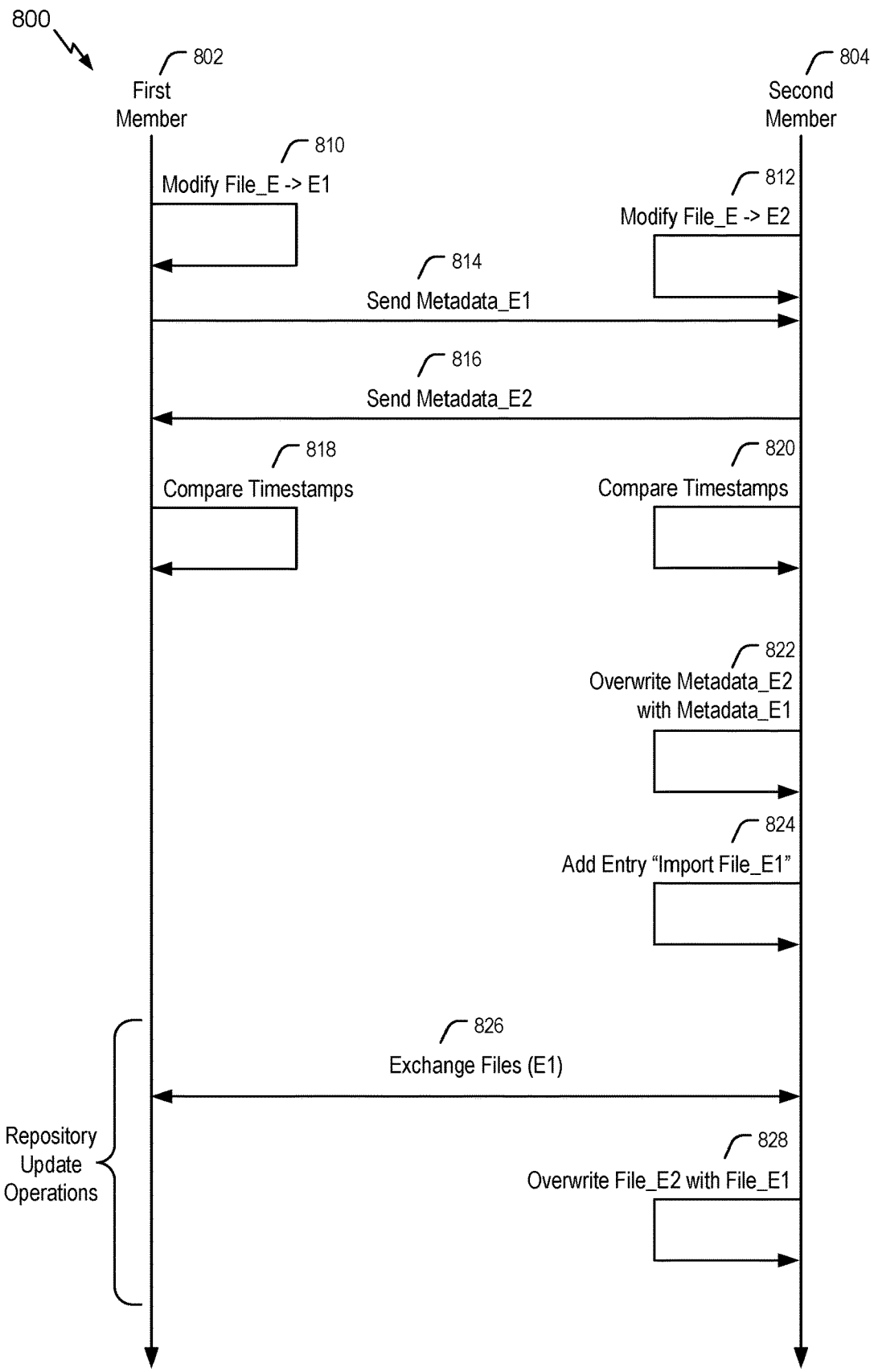
FIG. 8 is a diagram illustrating additional examples of operations for managing a federated software repository.

Referring to FIG. 8, a ladder diagram of operations for managing a federated software repository (e.g., a multi-device software repository) according to one or more aspects is shown as operations 800. Operations 800 may be performed by a first member 802 and a second member 804, which may be linked (e.g., via one or more networks) and configured to support a federated software repository between first member 802 and second member 804. In some implementations, first member 802 may include or correspond to first network device 310 and software repository 324 of FIG. 3, first member 410 of FIGS. 4A-E, first member 510 of FIGS. 5A-D, first member 602 of FIG. 6, or first member 702 of FIG. 7, and second member 804 may include or correspond to second network device 340 and software repository 352 of FIG. 3, second member 460 of FIGS. 4A-E, second member 560 of FIGS. 5A-D, second member 604 of FIG. 6, or second member 704 of FIG. 7. FIG. 8 illustrates an example of a conflict resolution process that is performed as metadata operations are performed.

Operations 800 may include first member 802 modifying File_E to create modified File_E1, at 810. Modifying File_E at first member 802 may also include modifying Metadata_E to create Metadata_E1. Based on modifying File_E, first member 802 may add a first event entry "Modify File_E" to an event log queue and may send Metadata_E1 to second member 804, at 814. For example, first member 802 may send a metadata update that includes Metadata_E1, and optionally an instruction to modify Metadata_E based on Metadata_E1, to second member 804. Prior to receiving Metadata_E1, second member 804 may modify File_E to create modified File_E2, at 812. Modifying File_E at second member 804 may also include modifying Metadata_E to create Metadata_E2. Based on modifying File_E, second member 804 may add a first event entry "Modify File_E" to an event log queue and may send Metadata_E2 to first member 802, at 816. For example, second member 804 may send a metadata update that includes Metadata_E2, and optionally an instruction to modify Metadata_E based on Metadata_E2, to first member 802.

Responsive to receiving metadata updates that correspond to files that have already been modified, the members 802 and 804 may perform conflict resolution to determine which operations to allow. To illustrate, responsive to determining that Metadata_E2 received from second member 804 corresponds to File_E and Metadata_E, which first member 802 already modified to create File_E1 and Metadata_E1, respectively, first member 802 may perform conflict resolution to determine whether to allow the modification performed by first member 802 or the modification performed by second member 804. In some implementations, conflict resolution may be based on timestamps associated with performance of the file modification operations. To illustrate, first member 802 may generate a first timestamp at the time that first member 802 receives the command to modify File_E to create File_E1, and first member 802 may include the first timestamp when sending Metadata_E1 to second member 804. Similarly, second member 804 may generate a second timestamp at the time that second member 804 receives the command to modify File_E to create File_E2, and second member 804 may include the second timestamp when sending Metadata_E2 to first member 802. In some implementations, modifications having an earlier timestamp may be allowed, and modifications have a later timestamp may be rejected, to resolve conflicts from multiple modifications to the same files. For example, first member 802 may compare the first timestamp to the second timestamp to determine that the first timestamp represents an earlier time, at 818. Similarly, second member 804 may compare the first timestamp to the second timestamp to determine that the first timestamp represents an earlier time, at 820.

Based on determining that the first timestamp represents the earlier time, members 802 and 804 may allow the first modification (e.g., File_E to File_E1 and Metadata_E to Metadata_E1) and reject the second modification (e.g., File_E to File_E2 and Metadata_E to Metadata_E2). To illustrate, first member 802 may discard Metadata_E2 from second member 804 and perform no additional modifications to File_E1 and Metadata_E1 stored at first member 802. Second member 804 may overwrite Metadata_E2 with Metadata_E1, at 822, and may add a first entry "Import File_E2" to its file queue, at 824. Overwriting its modified metadata with the metadata received from first member 802 causes second member 804 to accept the modification to File_E performed by first member 802 at the earlier time and to reject the modification already performed at second member 804. Additional operations may be performed, metadata updates sent, and entries added to event log queues and file queues, as described above. In some other implementations, conflict resolution is not performed as metadata updates may be fast enough to eliminate most or all conflicts, and any conflicts can be addressed by performing a full synchronization operation.

Repository update operations may occur, at 828-830. During performance of the repository update operations, first member 802 and second member 804 may retrieve entries from their file queues and exchange files. To illustrate, first member 802 and second member 804 may exchange files, at 826. Exchanging files may include second member 804 retrieving the first entry Import File_E1 from its file queue and sending an import request for File_E1 to first member 802, and first member 802 may sent a file update that includes File_E1, and optionally an instruction to modify File_E based on File_E1, to second member 804 responsive to receiving the import request. Second member 804 may overwrite File_E2 with File_E1, at 828. For example, second member 804 may retrieve the first event entry Modify File_E from its event log queue and overwrite File_E2 with File_E1 included in the file update received from first member 802. After performing the operations indicated by the retrieved entries from the file queues, first member 802 and second member 804 may delete the corresponding entries from the respective file queues. For example, after receiving File_E1, second member 804 may delete the first entry Import File_E1 from its file queue.

Figure 9:
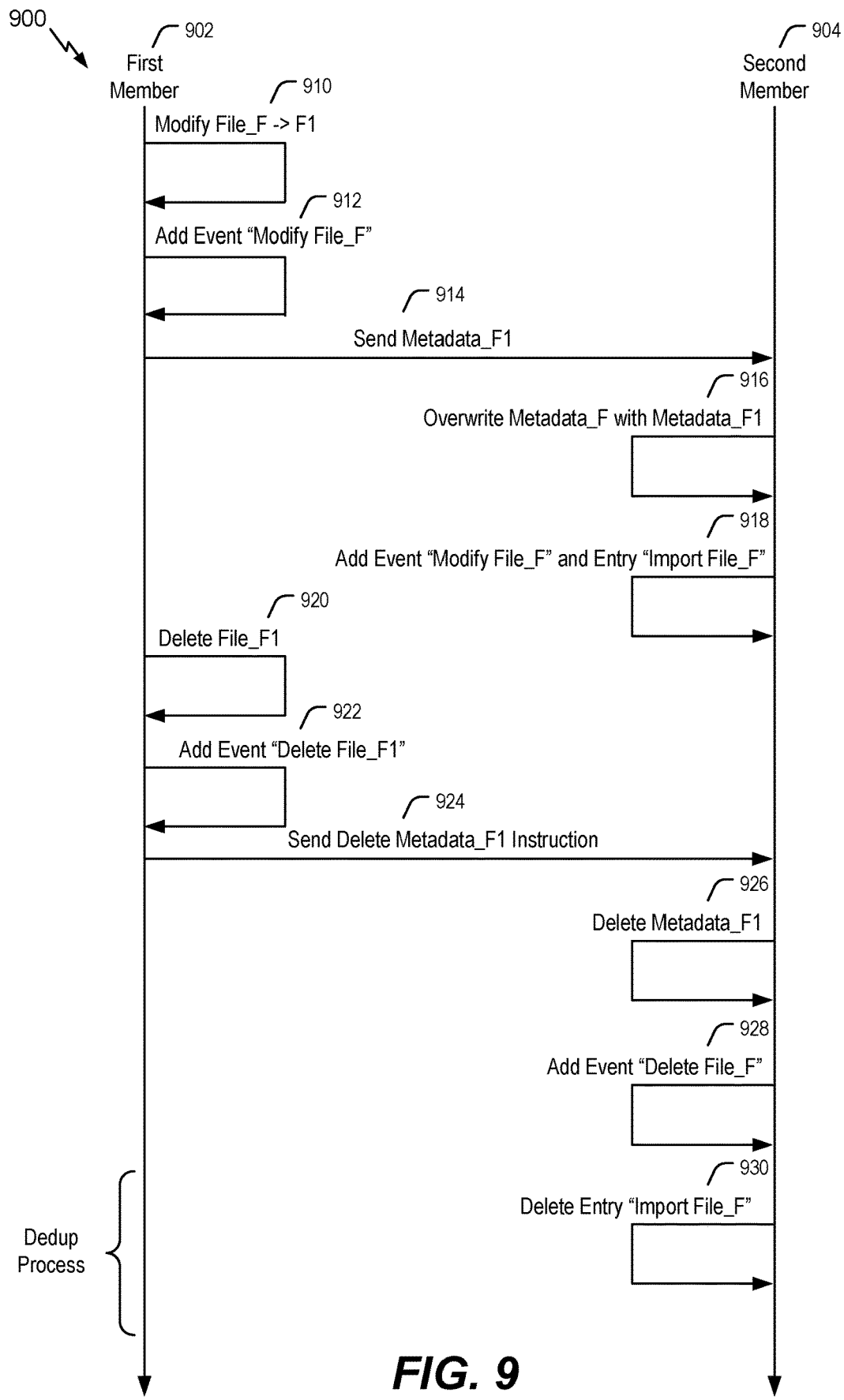
FIG. 9 is a diagram illustrating additional examples of operations for managing a federated software repository.

Referring to FIG. 9, a ladder diagram of operations for managing a federated software repository (e.g., a multi-device software repository) according to one or more aspects is shown as operations 900. Operations 900 may be performed by a first member 902 and a second member 904, which may be linked (e.g., via one or more networks) and configured to support a federated software repository between first member 902 and second member 904. In some implementations, first member 802 may include or correspond to first network device 310 and software repository 324 of FIG. 3, first member 410 of FIGS. 4A-E, first member 510 of FIGS. 5A-D, first member 602 of FIG. 6, first member 702 of FIG. 7, or first member 802 of FIG. 8, and second member 804 may include or correspond to second network device 340 and software repository 352 of FIG. 3, second member 460 of FIGS. 4A-E, second member 560 of FIGS. 5A-D, second member 604 of FIG. 6, second member 704 of FIG. 7, or second member 804 of FIG. 8. FIG. 9 illustrates an example of a deduplication process that is performed using event log queues and file queues.

Operations 900 may include first member 902 modifying File_F to create modified File_F1, at 910. Modifying File_F at first member 902 may include modifying Metadata_F to create Metadata_F1. Based on modifying File_F, first member 902 may add a first event entry Modify File_F to an event log queue at first member 902, at 912. Based on the first event entry, first member 902 may send Metadata_F1 to second member 904, at 912. For example, first member 902 may send a metadata update that includes Metadata_F1, and optionally an instruction to overwrite Metadata_F with Metadata_F1, to second member 904. Based on receiving Metadata_F1, second member 904 may overwrite Metadata_F with Metadata_F1, at 916. Second member 904 may also add a first event entry Modify File_F to an event log queue at second member 904, and second member 904 may add a first event "Import File_F" to a file queue at second member 904, at 918.

First member 902 may delete File_F1, at 920. For example, a client of first member 902 may initiate a delete operation to delete File_F1 at first member 902. Based on deleting File_F1, first member 902 may add a second event entry Delete File_F1 to its event log queue, at 922. Based on the second event entry, first member 902 may send a delete Metadata_F1 instruction to second member 904, at 924. For example, first member 902 may send a metadata update that includes an instruction to delete Metadata_F1, and optionally Metadata_F1 (or an indication thereof), to second member 904. Based on receiving the delete Metadata_F1 instruction, second member 904 may delete Metadata_F1, at 926. Second member 904 may also add a second event entry Delete File_F to its event log queue, at 928.

During a deduplication process, either triggered by addition of multiple events corresponding to the same file or another condition, or based on a schedule, second member 904 may remove duplicative or redundant entries from its file queue. To illustrate, second member 904 may determine whether any entries in its file queue correspond to the same file(s), and thus may be redundant. In the example illustrated in FIG. 9, sending Importing_F1 (indicated by the first entry) has become redundant due to the later deletion of File_F1 (indicated by the second entry). Other examples of redundant operations include adding a new file and later modifying the same file, which can be condensed into adding the later modified version of the file (instead of communicating the pre-modified and post-modified versions of the file), adding or modifying a file that is later deleted, performing multiple modifications to the same file, or the like. Based on a determination that entries correspond to duplicate actions, the members may condense or otherwise alter multiple entries to result in fewer entries. For example, second member 904 may delete the first entry Import File_F1, at 930, based on a determination that the second event entry Delete File_F1 overrules the first event entry Modify File_F1, and thus the first entry "Import File_F1" in the file queue is now unnecessary. Additional deduplication operations may be performed in a similar manner if other entries in the event log queues and file queues indicate duplication conditions.

Figure 10:
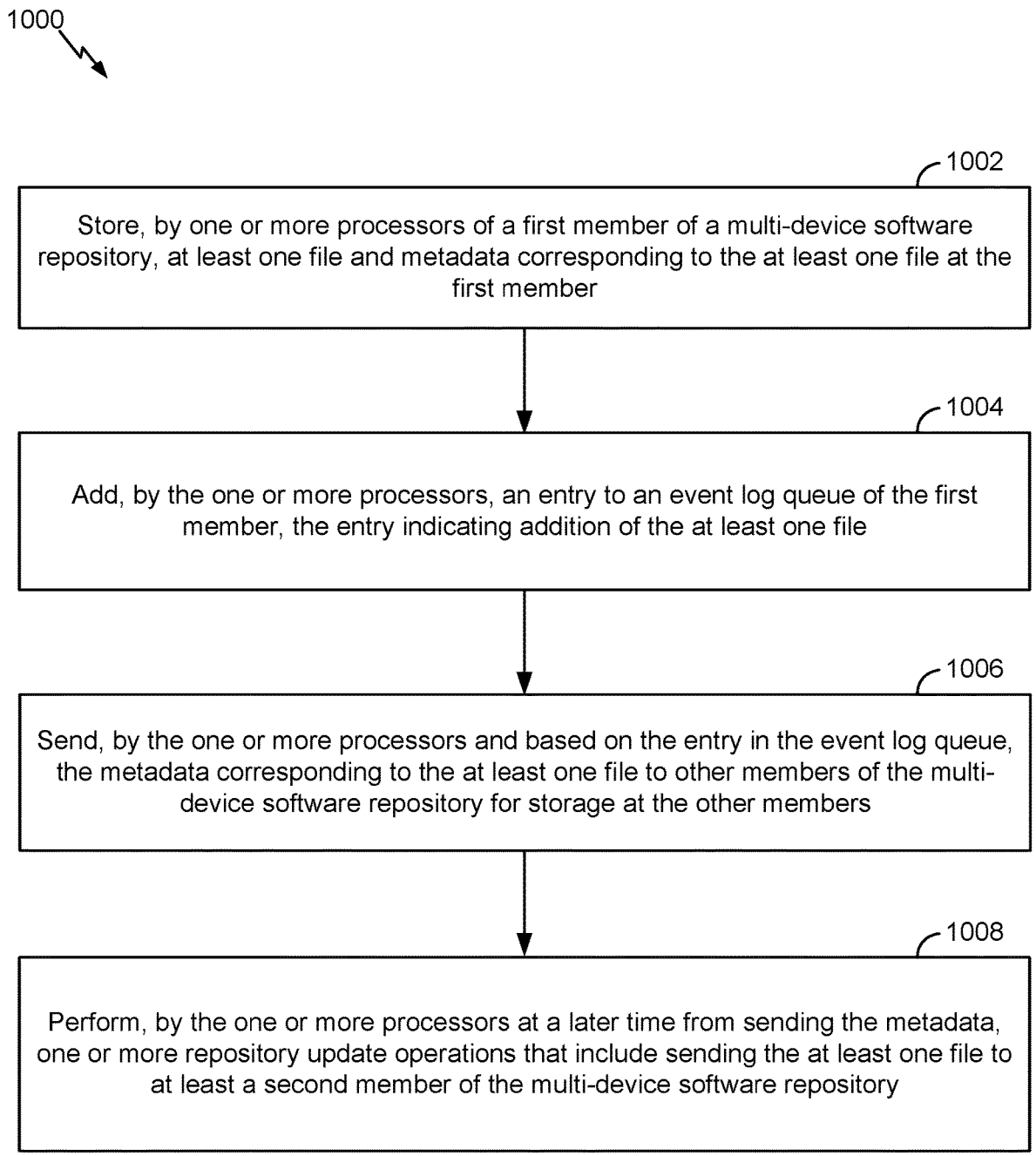
FIG. 10 is a flow diagram of an example of a method for managing a federated software repository across multiple devices.

Referring to FIG. 10, a flow diagram of a method for managing a federated software repository across multiple devices according to one or more aspects is shown as a method 1000. In some implementations, method 1000 may be performed by repository server 110 of FIGS. 1 and 2, repository server 168 of FIGS. 1 and 2, first network device 310, second network device 340, or third network device 360 of FIG. 3, first member 410 or second member 460 of FIGS. 4A-E, first member 510 or second member 560 of FIGS. 5A-D, first member 602 or second member 604 of FIG. 6, first member 702 or second member 704 of FIG. 7, first member 802 or second member 804 of FIG. 8, or first member 902 or second member 904 of FIG. 9. Additionally or alternatively, method 1000 may be stored in a computer-readable storage medium as instructions that, when executed by one or more processors, cause the one or more processors to perform the operations of method 1000.

At 1002, method 1000 includes storing, by a first member of a multi-device software repository, at least one file and metadata corresponding to the at least one file at the first member. For example, the first member may include or correspond to first network device 310 and software repository 324 of FIG. 3, first member 410 of FIGS. 4A-E, first member 510 of FIGS. 5A-D, first member 602 of FIG. 6, first member 702 of FIG. 7, first member 802 of FIG. 8, or first member 902 of FIG. 9, the at least one file may include or correspond to files 326 of FIG. 3 or third file 418 of FIGS. 4B-E, and the metadata may include or correspond to metadata 328 of FIG. 3 or third metadata 429 of FIGS. 4B-E.

At 1004, method 1000 further includes adding an entry to an event log queue of the first member. The entry indicates addition of the at least one file. For example, the event log queue may include or correspond to event log queue 330 of FIG. 3, event log queue 430 of FIGS. 4A-E, or event log queue 530 of FIGS. 5A-D, and the entry may include or correspond to first entry 432 of FIGS. 4B-D.

At 1006, method 1000 further includes sending, based on the entry in the event log queue, the metadata corresponding to the at least one file to other members of the multi-device software repository for storage at the other members. For example, the other members may include or correspond to second network device 340 and software repository 352 of FIG. 3, third network device 360 of FIG. 3, second member 460 of FIGS. 4A-E, second member 560 of FIGS. 5A-D, second member 604 of FIG. 6, second member 704 of FIG. 7, second member 804 of FIG. 8, or second member 904 of FIG. 9, and sending the metadata may include or correspond to metadata update 370 of FIG. 3 or metadata update 454 or metadata update 456 of FIG. 4B.

At 1008, method 1000 further includes performing, at a later time from sending the metadata, one or more repository update operations that include sending the at least one file to at least a second member of the multi-device software repository. For example, the repository update operations may include or correspond to file update 372 of FIG. 3 or file update 459 of FIG. 4D.

In some aspects, techniques for managing a federated software repository across multiple devices may include additional aspects, such as any single aspect or any combination of aspects described below or in connection with one or more other processes or devices described elsewhere herein. In some aspects, a system may be configured to manage a federated software repository across multiple devices. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the at least one processor. The at least one processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of managing a federated software repository across multiple devices may include one or more operations described herein with reference to the system.

In a first aspect, a first member of a multi-device software repository stores at least one file and metadata corresponding to the at least one file at the first member. The first member also adds an entry to an event log queue of the first member. The entry indicates addition of the at least one file. The first member sends, based on the entry in the event log queue, the metadata corresponding to the at least one file to other members of the multi-device software repository for storage at the other members. The first repository also performs, at a later time from sending the metadata, one or more repository update operations that include sending the at least one file to at least a second member of the multi-device software repository.

In a second aspect, in combination with the first aspect, the one or more repository update operations are performed as background operations at the first member.

In a third aspect, in combination with the first aspect or the second aspect, the one or more repository update operations further include receiving a request for the at least one file from the second member. The at least one file is sent to the second member based on receipt of the request.

In a fourth aspect, in combination with one or more of the first through third aspects, the first member adds a send file entry to a file queue of the first member based on storing the at least one file. The send file entry indicates to send the at least one file to the other members. The one or more repository update operations include a push operation performed to send the at least one file to at least the second member.

In a fifth aspect, in combination with one or more of the first through fourth aspects, the first member receives a trigger-based request for the at least one file from a third member of the multi-device software repository. The first member also sends the at least one file to the third member based on receipt of the trigger-based request.

In a sixth aspect, in combination with one or more of the first through fifth aspects, the first member deletes a second file stored at the first member and metadata corresponding to the second file. The first member also adds a second entry to the event log queue. The second entry indicates deletion of the second file. The first member also sends the metadata corresponding to the second file with an indication of deletion to the other members.

In a seventh aspect, in combination with the one or more of the first through sixth aspects, the first member aggregates the metadata corresponding to the at least one file with metadata corresponding to one or more updated files of a second multi-device software repository of which the first member is also a member. The aggregated metadata is sent to at least one of the other members of the multi-device software repository that are also members of the second multi-device software repository.

In an eighth aspect, in combination with one or more of the first through seventh aspects, the first member receives metadata corresponding to a third file from the second member and adds a third entry to the event log queue. The third entry indicates addition of the third file. The first member also stores the metadata corresponding to the third file and a placeholder file at the first member. The first member also adds an import file entry to a file queue of the first member. The import file entry indicates to import the third file from the second member.

In a ninth aspect, in combination with the eighth aspect, performing the one or more repository update operations further includes sending a request for the third file to the second member, receiving the third file from the second member, and storing the third file in place of the placeholder file at the first member.

In a tenth aspect, in combination with the eighth aspect, the first member modifies, prior to receipt of the third file, one or more existing files or corresponding metadata based on the metadata corresponding to the third file.

In an eleventh aspect, in combination with one or more of the first through tenth aspects, members of multi-device software repository are communicatively coupled together as a decentralized mesh.

In a twelfth aspect, in combination with one or more of the first through eleventh aspects, the at least one file includes at least one binary file.

In a thirteenth aspect, in combination with one or more of the first through twelfth aspects, the first member stores files in accordance with a container type supported by the multi-device software repository.

In a fourteenth aspect, in combination with the thirteenth aspect, the container type includes a Docker container.

In a fifteenth aspect, in combination with one or more of the first through fourteenth aspects, the first member receives metadata corresponding to a second file from the second member and adds a second entry to the event log queue. The second entry indicates addition of the second file. The first member also stores the metadata corresponding to the second file and a placeholder file corresponding to the second file at the first member. The first member also adds an import file entry to a file queue. The import file entry indicates to import the second file from the second member.

In a sixteenth aspect, in combination with one or more of the first through fifteenth aspects, the first member modifies the at least one file and the metadata corresponding to the at least one file at the first repository based on a user instruction having a first timestamp and adds a second entry to the event log queue. The second entry indicates modification of the at least one file. The first member also sends, based on the second entry in the event log queue, the modified metadata corresponding to the at least one file to the other members and receives other modified metadata corresponding to the at least one file from a third member of the multi-device software repository. The other modified metadata has a second timestamp. The first member also performs conflict resolution based on the first timestamp and the second timestamp.

In a seventeenth aspect, in combination with the sixteenth aspect, performing the conflict resolution includes discarding the other modified metadata based on the first timestamp being before the second timestamp.

In an eighteenth aspect, in combination with the sixteenth aspect, performing the conflict resolution includes overwriting the modified metadata corresponding to the at least one file at the first repository with the other modified metadata, removing the second entry from the event log queue, and adding a third entry to the event log queue. The third entry indicates modification of the at least one file by the third member. The first member also adds an import file entry to a file queue of the first member. The import file entry indicates to import a modified at least one file from the third member.

In a nineteenth aspect, in combination with one or more of the first through eighteenth aspects, the one or more repository update operations are performed in order of storage of entries in a file queue of the first member.

In a twentieth aspect, in combination with the nineteenth aspect, the first member removes, prior to performance of the one or more repository update operations, conflicting entries and redundant entries from the file queue.

In a twenty-first aspect, in combination with one or more of the first through twentieth aspects, the first member receives modified metadata corresponding to the at least one file from the second member, replaces the metadata corresponding to the at least one file with the modified metadata at the first member, and adds a second entry to the event log queue. The second entry indicates modification of the at least one file by the second member. The first member also adds an import file entry to a file queue of the first member. The import file entry indicates to import a modified at least one file from the second member.

In a twenty-second aspect, in combination with one or more of the first through twenty-first aspects, the one or more repository update operations are performed based on processing resource utilization of the first member or network activity falling below a threshold or based on a start of a designated sync time period after expiration of a threshold time period from adding the entry to the event log queue.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the scope of the present disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for managing a federated software repository across multiple devices, the method comprising:
    storing, by one or more processors of a first member of a multi-device software repository, at least one file and metadata corresponding to the at least one file at a first data structure of the first member;
    adding, by the one or more processors, an entry to an event log queue of the first member, wherein the event log queue is a separate data structure from the first data structure of the first member, the entry indicating:
        the storing of the at least one file and the metadata at the first data structure of the first member;
    sending, by the one or more processors and based on the entry to the event log queue, the metadata corresponding to the at least one file to other members of the multi-device software repository for storage at the other members;
    performing, by the one or more processors at a later time from sending the metadata, one or more repository update operations that include sending the at least one file to at least a second member of the multi-device software repository; and
    aggregating, by the one or more processors, the metadata corresponding to the at least one file with metadata corresponding to one or more updated files of a second multi-device software repository of which the first member or the second member is also a member;
    where the aggregated metadata is sent to at least one of the other members of the multi-device software repository that are also members of the second multi-device software repository.

2. The method of claim 1, where the one or more repository update operations are performed as background operations at the first member.

3. The method of claim 1, where the one or more repository update operations further include receiving, by the one or more processors, a request for the at least one file from the second member, and where the at least one file is sent to the second member based on receipt of the request.

4. The method of claim 1, further comprising:
adding, by the one or more processors, a send file entry to a file queue of the first member based on storing the at least one file, the send file entry indicating to send the at least one file to the other members; and
where the one or more repository update operations comprise a push operation performed to send the at least one file to at least the second member.

5. The method of claim 1, further comprising, prior to performing the one or more repository update operations:
receiving, by the one or more processors, a trigger-based request for the at least one file from a third member of the multi-device software repository; and
sending, by the one or more processors, the at least one file to the third member based on receipt of the trigger-based request.

6. The method of claim 1, further comprising:
deleting, by the one or more processors, a second file stored at the first member and metadata corresponding to the second file;
adding, by the one or more processors, a second entry to the event log queue, the second entry indicating deletion of the second file; and
sending, by the one or more processors, the metadata corresponding to the second file with an indicator of deletion to the other members.

7. The method of claim 1, further comprising:
receiving, by the one or more processors, metadata corresponding to a third file from the second member;
adding, by the one or more processors, a third entry to the event log queue, the third entry indicating addition of the third file;
storing, by the one or more processors, the metadata corresponding to the third file and a placeholder file at the first member; and
adding, by the one or more processors, an import file entry to a file queue of the first member, the import file entry indicating to import the third file from the second member.

8. The method of claim 7, where performing the one or more repository update operations further includes:
sending, by the one or more processors, a request for the third file to the second member;
receiving, by the one or more processors, the third file from the second member; and
storing, by the one or more processors, the third file in place of the placeholder file at the first member.

9. The method of claim 7, further comprising:
prior to receipt of the third file, modifying, by the one or more processors, one or more existing files or corresponding metadata based on the metadata corresponding to the third file.

10. A system for managing a federated software repository across multiple devices, the system comprising:
at least one memory storing instructions; and
one or more processors coupled to the at least one memory, the one or more processors configured to execute the instructions to cause the one or more processors to:
store at least one file and metadata corresponding to the at least one file at a first data structure, the at least one file associated with a multi-device software repository;
add an entry to an event log queue, wherein the event log queue is a separate data structure from the first data structure, the entry indicating:
the storing of the at least one file and the metadata at the first data structure;
send, based on the entry to the event log queue, the metadata corresponding to the at least one file to one or more other members of the multi-device software repository for storage at the other members;
at a later time from sending the metadata, perform one or more repository update operations that include sending the at least one file to at least one or more of the other members of the multi-device software repository;
receive metadata corresponding to a second file from a member of the other members;
add a second entry to the event log queue, the second entry indicating addition of the second file;
store the metadata corresponding to the second file and a placeholder file corresponding to the second file; and
add an import file entry to a file queue, the import file entry indicating to import the second file from one of the other members.

11. The system of claim 10, where members of the multi-device software repository are communicatively coupled together as a decentralized mesh.

12. The system of claim 10, where the at least one file comprises at least one binary file.

13. The system of claim 10, where the one or more processors are configured to store files in accordance with a container type supported by the multi-device software repository.

14. The system of claim 13, where the container type comprises a Docker container.

15. The system of claim 10, where execution of the instructions further causes the one or more processors to:
modify the at least one file and the metadata corresponding to the at least one file based on a user instruction having a first timestamp;
add a second entry to the event log queue, the second entry indicating modification of the at least one file;
send, based on the second entry in the event log queue, the modified metadata corresponding to the at least one file to the other members;
receive other modified metadata corresponding to the at least one file from a third member of the multi-device software repository, the other modified metadata having a second timestamp; and
perform conflict resolution based on the first timestamp and the second timestamp.

16. The system of claim 15, where performing the conflict resolution comprises discarding the other modified metadata based on the first timestamp being before the second timestamp.

17. The system of claim 15, where performing the conflict resolution comprises:
overwriting the modified metadata corresponding to the at least one file with the other modified metadata;
removing the second entry from the event log queue;
adding a third entry to the event log queue, the third entry indicating modification of the at least one file by the third member; and
adding an import file entry to a file queue, the import file entry indicating to import a modified at least one file from the third member.

18. A non-transitory computer-readable storage medium storing instructions that, when executed by one or more processors, cause the one or more processors to perform operations for managing a federated software repository across multiple devices, the operations comprising:

executing a first routine to store at least one file and metadata corresponding to the at least one file at a first data structure of a first member of a multi-device software repository;

executing a second routine to add an entry to an event log queue of the first member, wherein the event log queue is a separate data structure from the first data structure of the first member, the entry indicating:

the storing of the at least one file and the metadata at the first data structure;

executing a third routine to send, based on the entry to the event log queue, the metadata corresponding to the at least one file to one or more other members of the multi-device software repository for storage at the one or more other members; and executing a fourth routine to, at a later time from sending the metadata, perform one or more repository update operations that include sending the at least one file to at least one or more other members of the multi-device software repository;

executing a fifth routine to receive modified metadata corresponding to the at least one file from at least one of the one or more other members;

executing a sixth routine to replace the metadata corresponding to the at least one file with the modified metadata at the first member;

executing a seventh routine to add a second entry to the event log queue, the second entry indicating modification of the at least one file by the at least one of the one or more other members; and executing an eighth routine to add an import file entry to a file queue of the first member, the import file entry indicating to import a modified at least one file from a member of the one or more other members.

19. The non-transitory computer-readable storage medium of claim 18, where the one or more repository update operations are performed in order of storage of entries in a file queue of the first member.

20. The non-transitory computer-readable storage medium of claim 19, where the operations further comprise executing a fifth routine to remove, prior to performance of the one or more repository update operations, conflicting entries and redundant entries from the file queue.

21. The non-transitory computer-readable storage medium of claim 18, where the one or more repository update operations are performed based on processing resource utilization of the first member or network activity falling below a threshold or based on a start of a designated sync time period after expiration of a threshold time period from adding the entry to the event log queue.

* * * * *